US012683822B2

(12) United States Patent
Buttolph et al.

(10) Patent No.: US 12,683,822 B2
(45) Date of Patent: Jul. 14, 2026

(54) VERIFIABLE STATE TRANSITIONS

(71) Applicant: Ava Labs, Inc., New York, NY (US)

(72) Inventors: Stephen John Buttolph, Brooklyn, NY (US); Patrick Robert O'Grady, Palo Alto, CA (US)

(73) Assignee: Ava Labs, Inc., New York, NY (US)

( * ) Notice: Subject to any disclaimer, the term of this patent is extended or adjusted under 35 U.S.C. 154(b) by 0 days.

(21) Appl. No.: 19/183,085

(22) Filed: Apr. 18, 2025

(65) Prior Publication Data

US 2025/0330340 A1      Oct. 23, 2025

Related U.S. Application Data

(60) Provisional application No. 63/635,683, filed on Apr. 18, 2024.

(51) Int. Cl.
H04L 9/00          (2022.01)

(52) U.S. Cl.
CPC ..................................... H04L 9/50 (2022.05)

(58) Field of Classification Search
CPC ........................................................ H04L 9/50
See application file for complete search history.

(56) References Cited

U.S. PATENT DOCUMENTS

| 12,306,709 B2 * | 5/2025 | Kim ....................... G06F 11/085 |
| 12,309,169 B2 * | 5/2025 | Gould ................... H04L 63/123 |
| 2015/0120656 A1 * | 4/2015 | Ramnarayanan ... G06F 16/1744 |
| | | 707/616 |

| 2015/0120684 A1 * | 4/2015 | Bawaskar ............. G06F 16/137 |
| | | 707/693 |
| 2019/0156332 A1 * | 5/2019 | Christidis .......... G06Q 20/3829 |
| 2019/0158594 A1 | 5/2019 | Shadmon et al. |
| 2020/0073962 A1 * | 3/2020 | Natarajan ............. H04L 9/0643 |
| 2021/0081129 A1 * | 3/2021 | Tian ...................... G06F 3/0685 |
| 2021/0081320 A1 * | 3/2021 | Tian .................... G06F 12/0868 |
| 2021/0279358 A1 * | 9/2021 | Teel ...................... G06F 21/602 |
| 2024/0403281 A1 * | 12/2024 | Sul ............................. H04L 9/50 |
| 2025/0231930 A1 * | 7/2025 | Johnson .............. G06F 16/1744 |

(Continued)

FOREIGN PATENT DOCUMENTS

WO          2019/228573 A2      12/2019

OTHER PUBLICATIONS

Avalanche, From the Labs: Handling Blockchain State. Avalanche Blog, Mar. 10, 2023, 12 pages. Retrieved on May 28, 2025 from <https://www.avax.network/blog/from-the-labs-handling-blockchain-state>.

(Continued)

*Primary Examiner* — Blake I Narramore
(74) *Attorney, Agent, or Firm* — McDermott Will & Schulte LLP

(57)          ABSTRACT

A method for storing blockchain data includes receiving a first batch command, the first batch command comprising one or more write operations, and adding one or more entries to a new log file by performing the one or more write operations. The method further includes identifying one or more active entries from one or more previous log files, appending the identified one or more active entries to the new log file, and, based on a determination that the one or more previous log files do not comprise any other active entries, deleting the one or more previous log files.

18 Claims, 13 Drawing Sheets

100 ⟍

(56) References Cited

U.S. PATENT DOCUMENTS

2025/0232006 A1 * 7/2025 Lindsey .................. G06F 18/15

OTHER PUBLICATIONS

Avalanche, Introducing Firewood: A Next-Generation Database Built for High-Throughput Blockchains. Avalanche Blog, Sep. 27, 2023, 3 pages. Retrieved on May 29, 2025 from <https://www.avax. network/about/blog/introducing-firewood-a-next-generation-database-built-for-high-throughput-blockchains>.

Laine, D., Merkle DB ReadMe file (Github repository). Github, last modified Mar. 14, 2024, 31 pages. Retrieved on May 28, 2025 from <https://github.com/ava-labs/avalanchego/blob/ 7975cb723fa17d909017db6578252642ba796a62/x/merkledb/ README.md?plain=1#L194>.

Mondal, D., Merkle Patricia Trie. Ethereum, Sep. 4, 2024, 14 pages. Retrieved on May 28, 2025 from <https://ethereum.org/en/developers/ docs/data-structures-and-encoding/patricia-merkle-trie/>.

O'Grady, P., Processing 5 Billion Micropayments (at 100k TPS) with Vyrx and Vilmo. HackMD, last edited Apr. 18, 2024, 22 pages. Retrieved on May 29, 2025 from <https://hackmd.io/@patrickogrady/ vryx-poc>.

Swende, M.H., et al., Dodging a bullet: Ethereum State Problems. Ethereum Foundation Blog, May 18, 2021, 5 pages. Retrieved on May 28, 2025 from <https://blog.ethereum.org/2021/05/18/eth-state-problems>.

International Search Report and Written Opinion for International Patent Application No. PCT/US2025/025362, mailed Jul. 9, 2025 (9 pages).

* cited by examiner

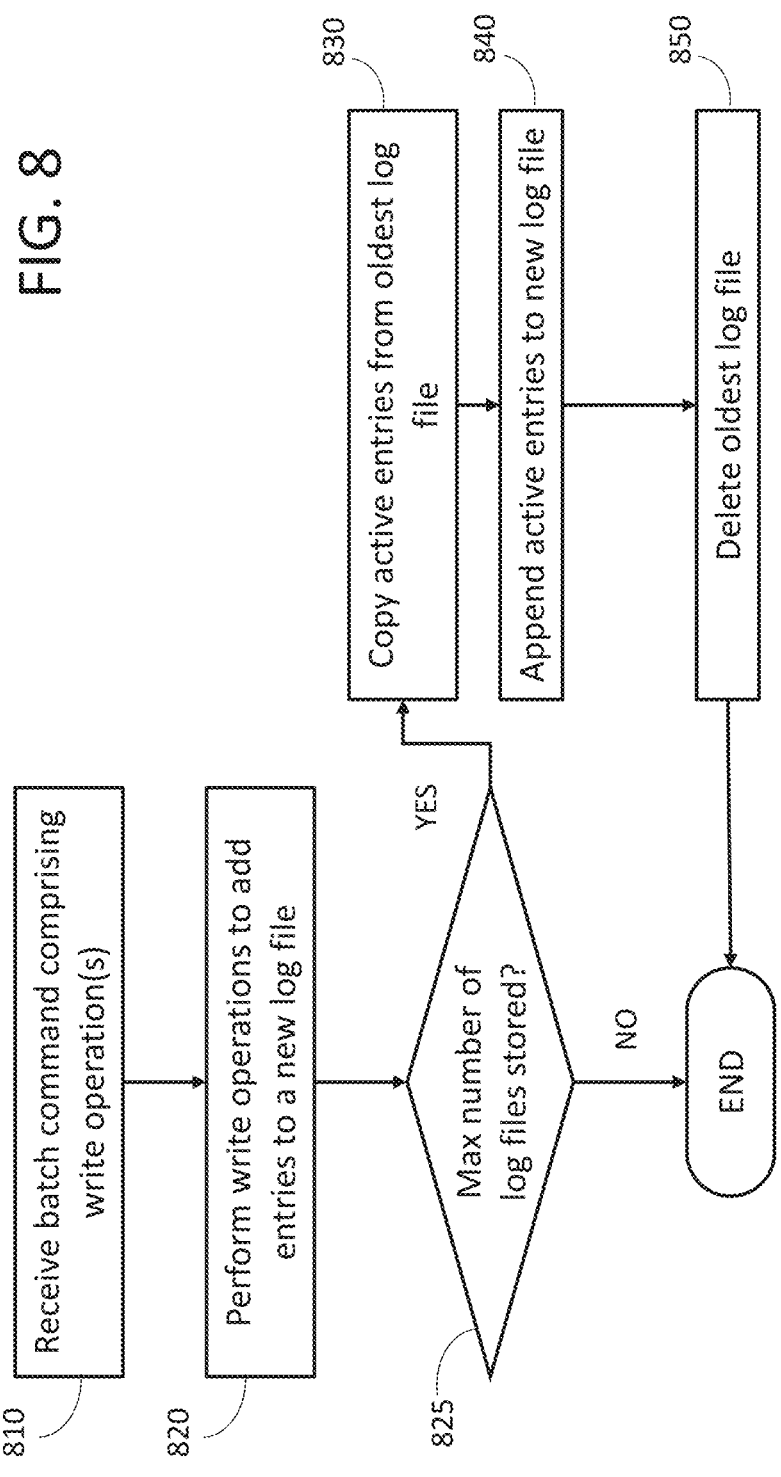
FIG. 8
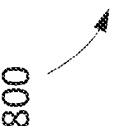

VERIFIABLE STATE TRANSITIONS

CROSS-REFERENCE OF RELATED APPLICATION

This application claims the benefit of U.S. Provisional Application No. 63/635,683, filed on Apr. 18, 2024, and which is incorporated herein in its entirety.

TECHNICAL FIELD

The present disclosure generally relates to blockchain technology, and more particularly to state storage layers for blockchains.

BACKGROUND

When designing a state storage layer for a blockchain, there are three primary capabilities that are typically considered: (1) proving the value of arbitrary keys in state, (2) enforcing that state transitions are applied consistently amongst all parties, and (3) fetching the current state efficiently and verifiably from existing participants (to avoid re-execution of all state transitions). When all these capabilities are required, most blockchains opt to merklize their state [1,2] either once per block or once every few blocks (batched state updates can be more efficient). Once state is merklized, it can be efficiently represented by a single hash, the Merkle root. If any values are modified, this root will change (i.e., two states will only have the same root if they have the same state). With this root, one can (1) generate a proof that any key-value (or range of key-values) is described by a root by providing a path of hashes from the root to the key-value in question. One can (2) enforce state transitions are applied consistently by checking whether this root (typically just 32 bytes) is the same as the root others have computed. One can (3) fetch the current state from existing participants by requesting a range of key-values from a given root and verifying the proof provided (this can even be done on-the-fly as roots are updated with some clever tricks [3]).

Merklization, however, is not "free." Each state update/read (not including any additional cost to update/maintain the underlying database that persists the Merkle structure to disk) incurs a cost of 'O(log(n))' and intermediate (inner) nodes must be maintained although they contain no workload data (just hashes of other nodes, which may be more intermediate nodes in a large trie). Most blockchains get around the 'O(log(n))' complexity for each read by maintaining a flat, key-value store [4] that sits in front of the Merkle Trie; however, this approach requires storing a copy of all values and does nothing to reduce the cost of updating the Merkle trie (in fact, it increases the cost because the value must be stored in both places). Others have opted to store intermediate (inner) nodes in memory to avoid excessive disk writes or have opted to only update the Merkle trie every 'n' blocks to better amortize the cost of each update. New databases [5] have been built to avoid the overhead of the underlying database managing the Merkle Trie on-disk (which has typically been done in an embedded database that isn't optimized for this workload).

In other words, using key-value stores to store large amounts of structured data on disk requires traversal of the Merkle tree from a starting root to find the value of a given key. As more data is stored, finding the value requires deeper and deeper traversal. As such, there is a need for storage solutions that don't need to prove the value of arbitrary keys in state but still want to enforce state transitions being applied consistently and enable new nodes to efficiently fetch the current state from existing participants.

SUMMARY

Some embodiments of the present disclosure provide a method for storing blockchain data. The method includes receiving a first batch command, the first batch command including one or more write operations, and adding one or more entries to a new log file by performing the one or more write operations. The method further includes identifying one or more active entries from one or more previous log files, appending the identified one or more active entries to the new log file, and, based on a determination that the one or more previous log files do not comprise any other active entries, deleting the one or more previous log files.

Some embodiments of the present disclosure provide a non-transitory computer-readable medium storing a program for storing blockchain data. The program, when executed by a computer, configures the computer to receive a first batch command, the first batch command including one or more write operations, and adds one or more entries to a new log file by performing the one or more write operations. The program, when executed by the computer, further configures the computer to identify one or more active entries from one or more previous log files, append the identified one or more active entries to the new log file, and, based on a determination that the one or more previous log files do not comprise any other active entries, delete the one or more previous log files.

Some embodiments of the present disclosure provide a system for storing blockchain data. The system comprises a processor and a non-transitory computer readable medium storing a set of instructions, which when executed by the processor, configure the system to receive a first batch command, the first batch command including one or more write operations, and add one or more entries to a new log file by performing the one or more write operations. The instructions, when executed by the processor, further configure the system to identify one or more active entries from one or more previous log files, append the identified one or more active entries to the new log file, and, based on a determination that the one or more previous log files do not comprise any other active entries, delete the one or more previous log files.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments.

FIG. 3A and FIG. 3B are a block diagram illustrating a workflow for blockchain storage, according to some embodiments.

FIG. 8 is a flowchart illustrating a process for storing blockchain data, according to some embodiments.

Figure 1:
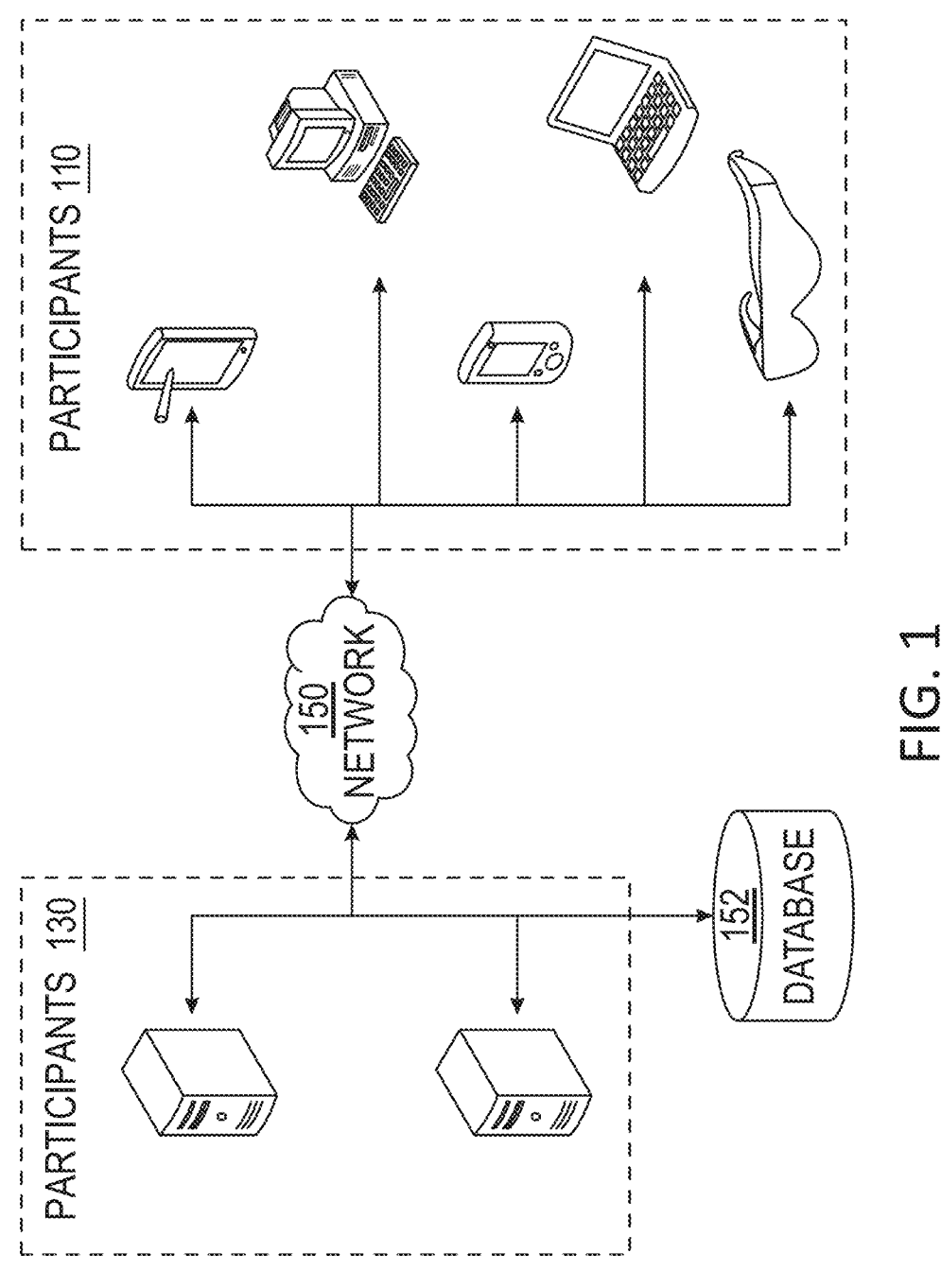
FIG. 1 illustrates a network architecture used to implement a blockchain platform.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

All references cited anywhere in this specification, including the Background and Detailed Description sections, are incorporated by reference as if each had been individually incorporated.

The term "blockchain" as used herein refers, according to some embodiments, to a database that maintains records for transactions and tracking of assets in blocks associated with users distributed across a blockchain network. Each blockchain may be a linear chain of blocks of the same dimension, such as the same height, size, length, etc. Blocks of the blockchain may comprise or store data or organized information (e.g., records of information), including a cryptographic hash of the previous block, a timestamp, and transaction data, for example.

Blockchain platforms may utilize a consensus protocol as a building block for building distributed systems. As an example, a blockchain platform can include multiple blockchains (equivalently referred to as subnets) that can be used for different types of applications, including but not limited to a component exchange blockchain for creating and trading digital smart assets, a metadata blockchain for coordinating validators as well as tracking and creating subnets, and a contract blockchain for creating smart contracts on the blockchain network.

As used herein, the term "block" generally refers to a record that is kept in a blockchain. For example, each block contains a cryptographic hash of the previous block, a timestamp, and transaction data. The state of each block and/or the transaction data may be represented as a Merkle tree root hash. In some embodiments, a block may be equivalently referred to as a "batch," or may be associated with a "batch" of data operations (e.g., write, delete, update, etc.).

The term "subnet" as used herein refers, according to some embodiments, to independent blockchain networks that run on top of the parent blockchain platform and allow developers and organizations to create custom blockchains with their own rules, consensus mechanisms, and token economics. A subnet includes a dynamic set of nodes (e.g., one or more validators) seeking to achieve consensus on a state of a set of blockchains such that one blockchain is validated by one subnet, although one subnet can validate multiple blockchains. A node can participate in the validation of multiple subnets and can be subject to requirements of the blockchains within those subnets, such as for security, licensing, hardware and/or the like. Subnets may be equivalently referred to herein as "subnetworks."

Blockchains being validated by validators may be of a blockchain network (or platform) with application-level logic defined by multiple virtual machines (VMs) which enable more decentralized networks. In particular, a blockchain may be an instance of a VM that specifies the blockchain's state, state transition function, transactions, and application programming interface (API) for user interaction. The VM allows for the execution of smart contracts and decentralized applications on the blockchain, providing a secure and deterministic environment for code execution and enabling interoperability between blockchains or cross-chain communication.

The term "framework" as used herein refers, according to some embodiments, to a software development kit (e.g., an open-source software platform) that provides the necessary infrastructure and standards for developing various blockchain-based systems and applications. A framework may be equivalently referred to herein as a "blockchain framework" or a "hyper framework."

The term "hyper framework" as used herein refers, according to some embodiments, to a framework (e.g., a software development kit, or SDK) for building high-performance blockchains on a blockchain platform. The hyper framework may be equivalently referred to herein as a "framework" or a "hypersdk."

The term "hyper VM" as used herein refers, according to some embodiments, to a blockchain Virtual Machine (VM) built using the hypersdk.

The term "hyper chain" as used herein refers, according to some embodiments, to a hyper VM deployed on a blockchain platform. In some embodiments, the hyper VM may be deployed on a blockchain platform that supports subnets. The hyper chain may be equivalently referred to herein as a "chain."

Embodiments, as disclosed herein, provide a solution to the above-mentioned problems rooted in computer technology, namely, providing storage solutions for blockchain platforms that do not need to prove the value of arbitrary keys in state while still enforcing state transitions being applied consistently and enabling new nodes to efficiently fetch the current state from existing participants. The disclosed subject technology provides improvements to the technological field by increasing the performance of blockchain platforms, by at least increasing the volume and speed of transactions on blockchain platforms.

Some embodiments include non-zero cost tradeoffs to maximize throughput and minimize resource usage. These tradeoffs may include one or more of (1) checksum-ing state instead of merklizing it, (2) storing an index of the disk location of all values in-memory, (3) requiring transactions to be committed before it is known whether they can be executed, and (4) charging fees for on-chain activity in 5 dimensions (bandwidth, compute, read, allocate, write).

Some embodiments use unstructured data without a tree, using logs to store the data. Some embodiments load key-value mappings into memory and combine with database compaction. Compaction is therefore explicit as part of the blockchain structure, and state synchronization may be performed by adding that structure. Proving individual keys is not needed, as the full state is downloaded and authenticated. Whenever a block is processed, the changes to the block are added to the log, and compaction is performed on the oldest entries. This approach avoids expensive tree-based operations but still enables write amplification.

Some embodiments optimize for large (e.g., 100k+ key-values) batch writes by using a collection of rotating append-only log files, including but not limited to write-ahead logs (WALs). The deterministic checksum of the changes written in a single batch to a log file can then be used to compare the result of execution between multiple parties. When most of the data previously written to a log file is no longer "alive," the log file may be compacted (rewritten) to only include "alive" data. When a batch is appended to an existing log file, the checksum of the last batch may be added to the checksum calculation of the new batch so that the entire log file can be verified rather than just the latest batch. Some embodiments allow for other parties to sync the last 'n' log files from the chain to fully sync the latest state, by applying the modifications in order. Some embodiments assume that the operator keeps an index of all alive keys and the location of their values in-memory. Each log file may be mapped into memory (e.g., using "mmap") for fast access.

In some embodiments, compaction (when required) occurs during block execution and is synchronized across all nodes. The frequency of this compaction may be tunable (i.e., how much "useless" data can live in a log before cleanup); however, the timing of this compaction (during block execution) is not. This approach allows for a forthcoming implementation of state expiry and/or state rent to be applied during compaction (charging a fee to each key that is preserved during a rewrite). This fee would likely increase the larger the log file is to deter an attacker from purposely increasing the size of a single log file to increase the time compaction will take. Some embodiments are optimized for log files being of uniform size. Exposing state compaction to a HyperSDK allows it to better charge for resource usage that is currently not accounted for in most blockchains (i.e., the cost of maintaining state on-disk).

FIG. 1 illustrates a network architecture 100 used to implement a blockchain platform. Specifically, in this example, the network architecture 100 provides a blockchain implementation and deployment framework, according to some embodiments.

In the example of FIG. 1, the network architecture 100 includes one or more participants 110 and one or more participants 130 which are communicatively coupled through a network 150. The network 150 may include a wired network (e.g., via fiber optic or copper wire, telephone lines, and the like) and/or a wireless network (e.g., a satellite network, a cellular network, radiofrequency (RF) network, Wi-Fi, Bluetooth, and the like). The network 150 may further include one or more of a local area network (LAN), a wide area network (WAN), the Internet, and the like. Further, the network 150 may include, but is not limited to, any one or more of the following network topologies, including a bus network, a star network, a ring network, a mesh network, and the like.

The participants 110 may include any one of a laptop computer, a desktop computer, or a mobile device such as a smart phone, a palm device, a tablet device, a television, a wearable device, a display device, and/or the like. The participants 110 may be clients of the blockchain platform for creating, expanding, or otherwise modifying customized blockchain networks and/or private or public subnets.

In some embodiments, the participants 130 may be a cloud server or a group of cloud servers. In other embodiments, some or all of the participants 130 may not be cloud-based servers (i.e., may be implemented outside of a cloud computing environment, including but not limited to an on-premises environment), or may be partially cloud-based. Some or all of the participants 130 may be a computing device such as part of a cloud computing server including one or more desktop computers or panels mounted on racks, and/or the like. The panels may include processing boards and also switchboards, routers, and other network devices. In some embodiments, the participants 130 may include the participants 110 as well, such that they are peers.

The participants 110 and/or the participants 130 may function as nodes for one or more blockchains implemented on the network architecture 100. As an example, the participants 110 and/or the participants 130 may themselves be, or may execute, virtual machines (VMs) that function as nodes of one or more blockchains and accordingly run software to verify block and transaction data, store data, validate, respond to network requests for data, execute smart contracts, and/or the like for their respective blockchain(s).

As a non-limiting example, multiple participants 110 may have access to at least one blockchain network hosted by the participants 130. As another non-limiting example, the participants 130 may provide services such as Internet based services including web2 services and web3 services, for example, to the participants 110.

The participants 130 may store blockchain data in a peer-to-peer (P2P) and/or distributed ledger fashion in a database 152. Database 152 may be a single database or a distributed database. The database 152 may store relevant information including, but not limited to, a shared registry, execution and verification logic, and/or rules for implementing consensus and messaging protocols.

The participants 130 may be configured to concurrently implement multiple blockchains of different types, including but not limited to an asset blockchain (e.g., for creating new assets, asset exchange, cross-subnet transfers), a metadata blockchain (e.g., for coordinating validators, tracking active subnets, and creating new subnets), and a smart contract blockchain (e.g., for creating smart contracts and applications that require total ordering).

Figure 2:
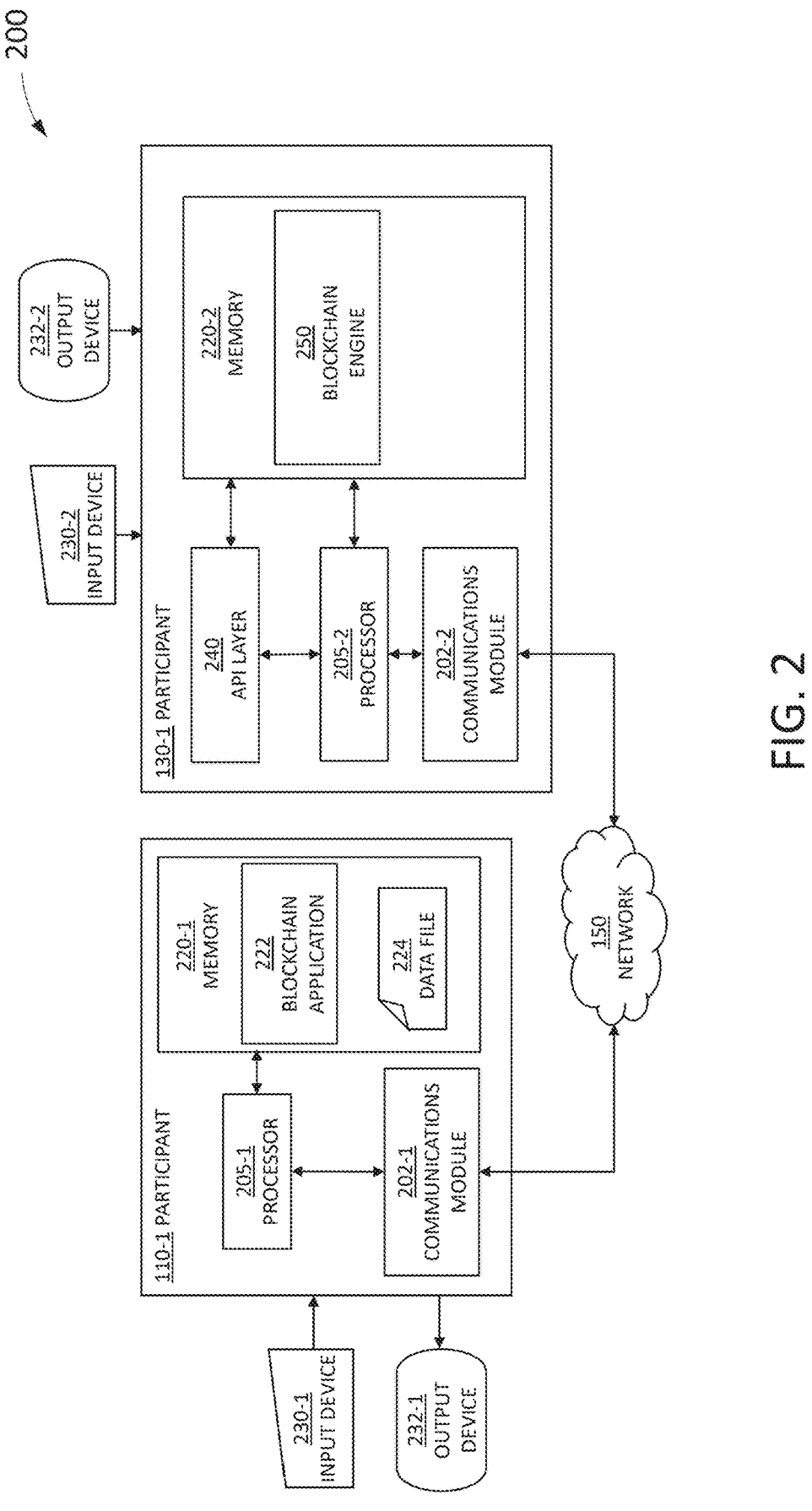
FIG. 2 is a block diagram illustrating details of a system for storing blockchain data, according to some embodiments.

FIG. 2 is a block diagram illustrating details of a system 200 for storing blockchain data, according to some embodiments. Specifically, the example of FIG. 2 illustrates an exemplary participant 110-1 (of the participants 110) and an exemplary participant 130-1 (of the participants 130) of the network architecture 100 of FIG. 1. The system 200 may implement protocols for blockchain storage for any subnet or blockchain executing on the network architecture 100. A blockchain platform implemented on system 200 may include blockchains validated and secured by a primary subnet (e.g., primary network) comprising one or more of the participants 130 and/or participants 110. For example, in some embodiments, participant 110-1 and/or participant 130-1 may be configured to operate as blockchain validators to verify transactions on a blockchain.

The participant 110-1 and the participants 130-1 access each other and other devices in the network 150 via corresponding communications modules 202-1 and 202-2, respectively. The communications modules 202-1 and 202-2 can be, for example, modems or Ethernet cards, and may include radio hardware and software for wireless communications (e.g., via electromagnetic radiation, such as radiofrequency (RF), near field communications (NFC), Wi-Fi, and Bluetooth radio technology). The participant 110-1 and participant 130-1 also include a processor 205-1, 205-2 and memory 220-1, 220-2, respectively. Communications modules 202-1 and 202-2, processors 205-1 and 205-2, and memories 220-1 and 220-2 will be collectively referred to, hereinafter, as "communications modules 202," "processors 205," and "memories 220." Processors 205 may be configured to execute instructions stored in memories 220, to cause participant 110-1 and/or participant 130-1 to perform methods and operations consistent with embodiments of the present disclosure.

The participant 110-1 and the participant 130-1 are coupled to at least one input device 230-1 and input device 230-2, respectively (hereinafter, collectively referred to as "input devices 230"). The input devices 230 can include a mouse, a keyboard, a pointer, a stylus, a touchscreen, a microphone, voice recognition software, a joystick, a virtual joystick, a touch-screen display, and the like. The participant 110-1 and the participant 130-1 are also coupled to at least one output device 232-1 and output device 232-2, respectively (hereinafter, collectively referred to as "output devices 232"). The output devices 232 may include a display (e.g., a same touchscreen display used as an input device), a speaker, an alarm, and the like. A user may interact with participant 110-1 and/or participant 130-1 via the input devices 230 and the output devices 232.

The participant 110-1 can implement and/or manage a blockchain platform by executing blockchain application 222 executing within memory 220-1 and couple with input devices 230 and output devices 232. The blockchain application 222 may be downloaded by a user from participant 130-1, and/or may be hosted by participant 130-1. The blockchain application 222 includes specific instructions which, when executed by processor 205-1, perform operations consistent with embodiments of the present disclosure.

In some embodiments, the blockchain application 222 runs on an operating system (OS) installed on participant 110-1. In some embodiments, blockchain application 222 may run within a web browser. In some embodiments, the processor 205-1 is configured to control a graphical user interface (GUI) (spanning at least a portion of input devices 230 and output devices 232) for the user of participant 110-1 to access participant 130-1.

Data and files associated with the blockchain application 222 may be stored in a local data file 224 stored in memory 220-1, a local database of participant 110-1 or participant 130-1, or an external database (e.g., database 152, a distributed database, and the like). The participant 110-1 may be used by a user of the blockchain platform to perform blockchain functions including, but not limited to, message transfer, exchange transactions, blockchain validation, block proposal, and the like.

Participant 130-1 includes an API layer 240, which may control the blockchain application 222 in participant 110-1. API layer 240 may also provide instructions, procedural information, updates, or the like to participant 110-1 as, e.g., new features are uploaded in the blockchain application 222.

In some embodiments, memory 220-2 includes a blockchain engine 250. The blockchain engine 250 may be configured to perform methods and operations consistent with embodiments of the present disclosure. The blockchain engine 250 may share or provide features and resources with the client device, including data, libraries, and/or applications retrieved with blockchain engine 250 (e.g., blockchain application 222). The user may access the blockchain engine 250 through the blockchain application 222. The blockchain application 222 may be installed in participant 110-1 by participant 130-1 and perform scripts and other routines provided by participant 130-1.

In some embodiments, data may be written or modified in the blockchain database in batches of write operations. Batched write operations may be performed upon separate files (e.g., local data file 224), here equivalently referred to as log files. The log files may be stored on disk, in memory, or some hybrid thereof (e.g., as cached files). The state of the database may be assessed by reading some or all of the batches.

Figure 3A:
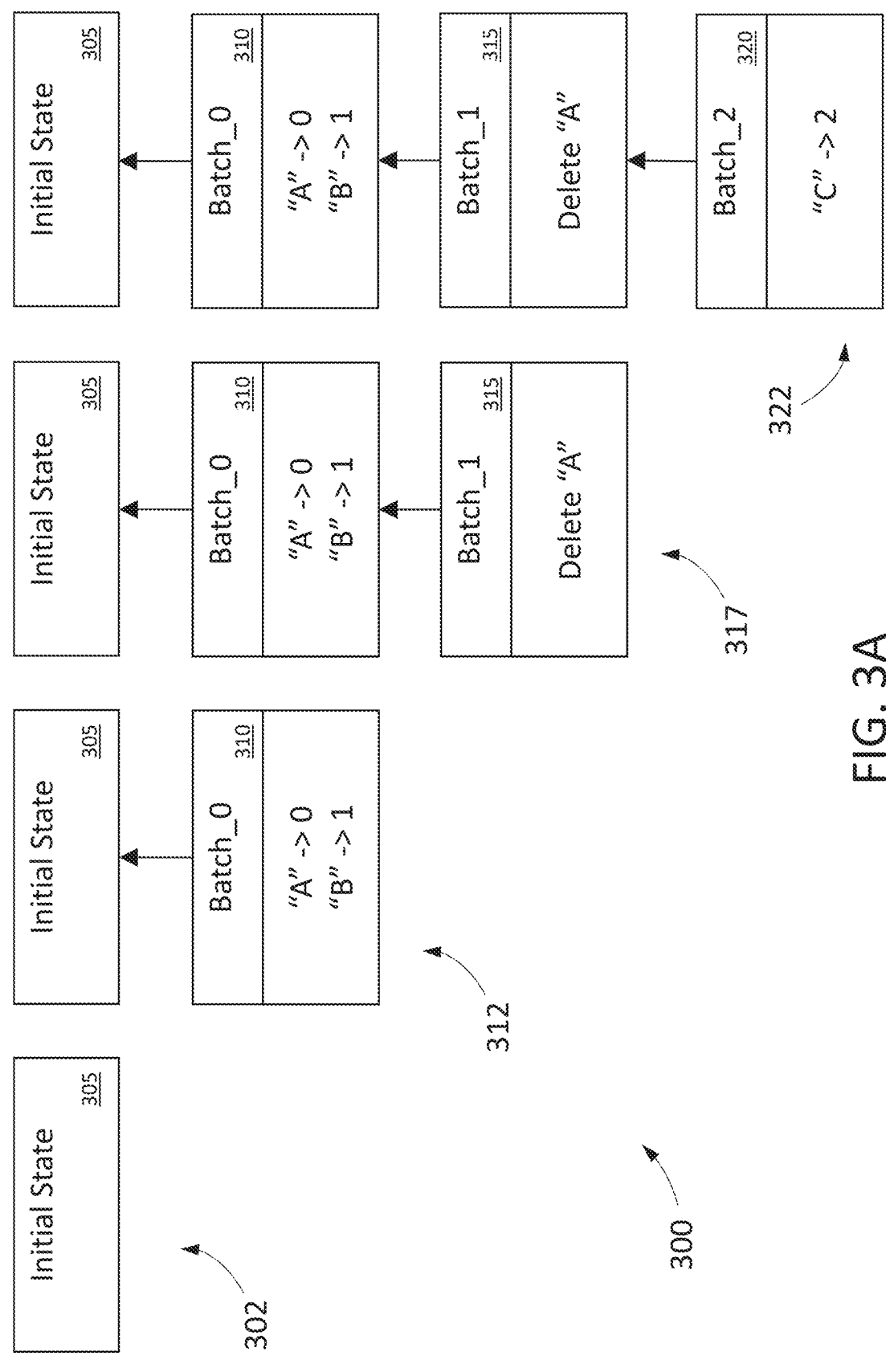
Figure 3B:
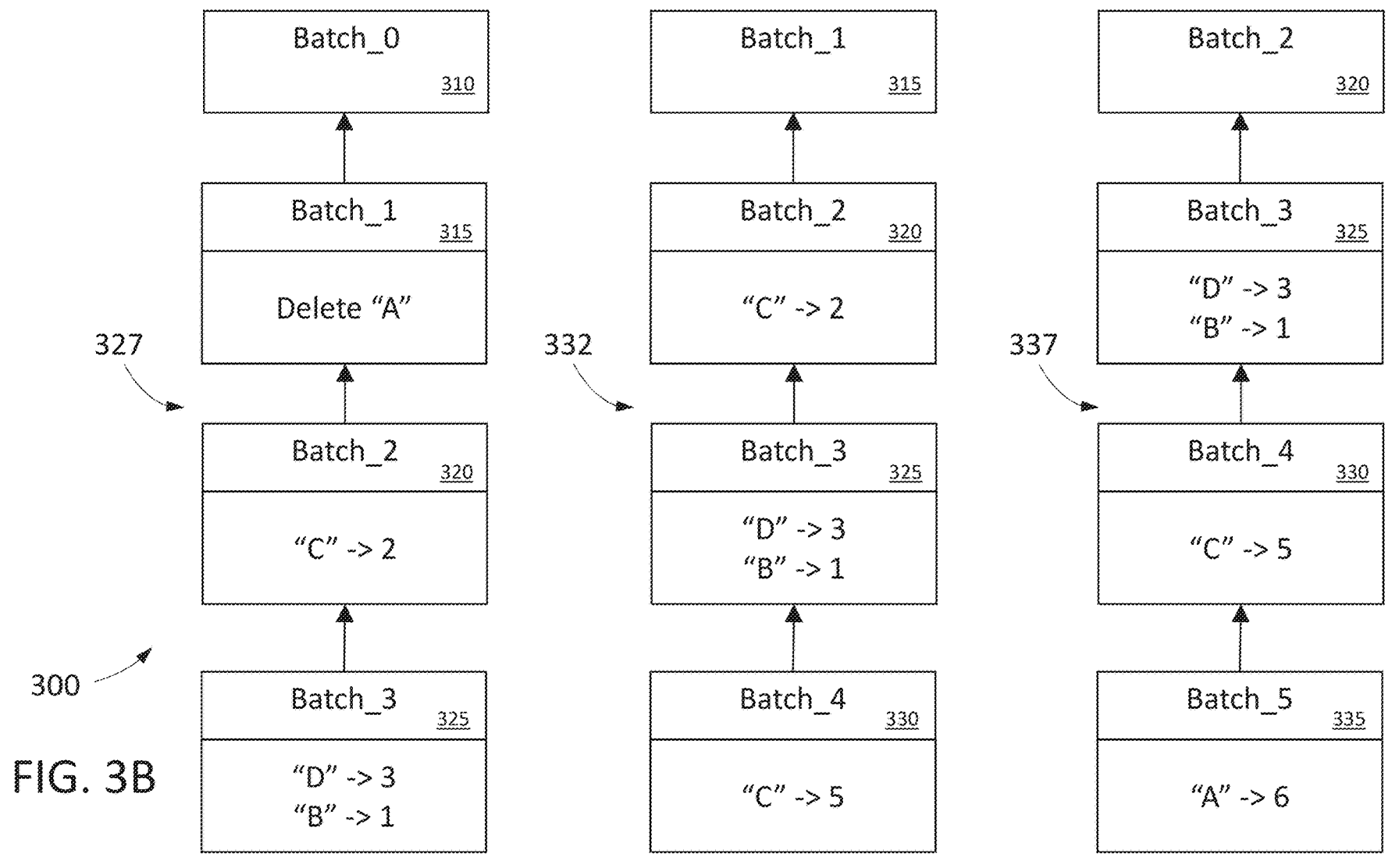

FIG. 3A and FIG. 3B are a block diagram illustrating a workflow 300 for blockchain storage, according to some embodiments. In this non-limiting example, the max number of batches that may be stored is limited to three.

As illustrated in FIG. 3A, an initial state of the blockchain is represented by blockchain diagram 302. Before any data is stored in the blockchain, the initial state 305 of the database is empty, and the state of the database may be represented by the empty set:

{ }.

The first batch 310, labeled Batch_0, is written, in which 2 entries are added to the database, "A"→0 and "B"→1. After this operation, the state of the blockchain is represented by blockchain diagram 312, and the state of the database is now:

{"A": 0, "B": 1}.

The second batch 315, labeled Batch_1, is written, in which 1 entry is removed from the database, "Delete A." After this operation, the state of the blockchain is represented by blockchain diagram 317, and the state of the database is now:

{"B": 1}.

The third batch 320, labeled Batch_2, is written, in which 1 entry is added to the database, "C"→2. After this operation, the state of the blockchain is represented by blockchain diagram 322, and the state of the database is now:

{"B": 1, "C": 2}.

Continuing to FIG. 3B, the fourth batch 325, labeled Batch_3, is written, in which 1 entry is added to the database, "D"→3. Since only three batches may be stored on the disk, Batch_0 (currently the oldest batch) is removed from storage after writing Batch_3. In order to delete Batch_0, any unmodified entries from Batch_0 are appended to the end of the new Batch_3, in this case "B"→1. After this operation, the state of the blockchain is represented by blockchain diagram 327, and the state of the database is now:

{"B": 1, "C": 2, "D": 3}.

The fifth batch 330, labeled Batch_4, is written, in which 1 entry is updated in the database, "C"→5. Since only three batches may be stored on the disk, Batch_1 (currently the oldest batch) is removed from storage after writing Batch_4. Since there are no unmodified entries from Batch_1, nothing needs to be appended to the end of the new Batch_4. After this operation, the state of the blockchain is represented by blockchain diagram 332, and the state of the database is now:

{"B": 1, "C": 5, "D": 3}.

The sixth batch 335, labeled Batch_5, is written, in which 1 entry is added to the database, "A"→6. Note that this is not an update since A was deleted in the second batch. Since only three batches may be stored on the disk, Batch_2 (currently the oldest batch) is removed from storage after writing Batch_5. Since there are no unmodified entries from Batch_3, nothing needs to be appended to the end of the new Batch_5. After this operation, the state of the blockchain is represented by blockchain diagram 337, and the state of the database is now:

{"A": 6, "B": 1, "C": 5, "D": 3}.

Note that in this example, the data is stored in the database with sorted keys (A, B, C, D). This facilitates finding the value associated with a given key.

In the example of FIGS. 3A-B, there is no limit on the size of a single batch. This means that the database could be very "bursty" with disk requests. In the worst case, the entire database may need to be re-written. To address this, rather than re-writing entire batches, individual entries may be re-processed. Accordingly, some embodiments improve on the simple logical flow by bounding the number of writes.

Figure 4A:
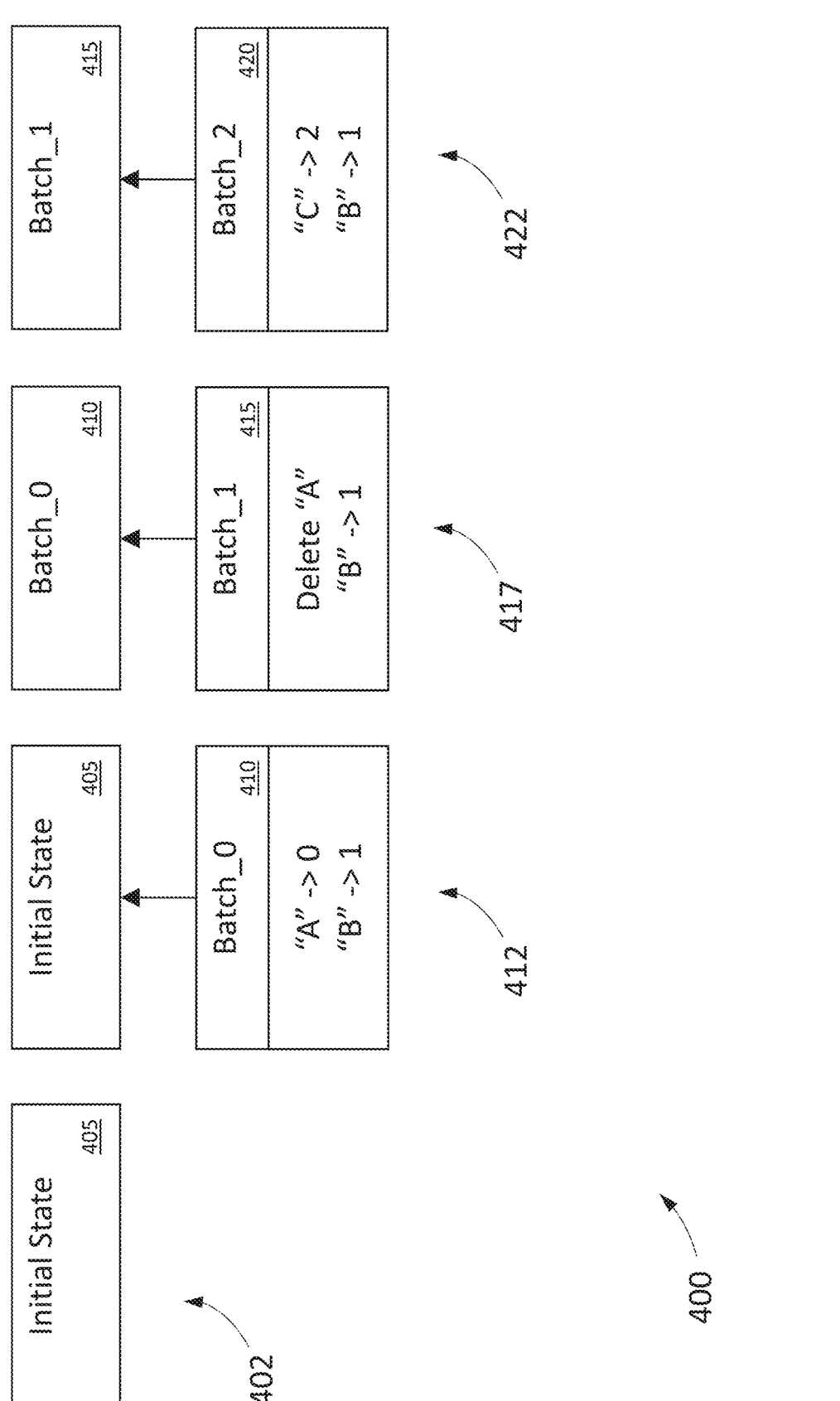
FIG. 4A and FIG. 4B are a block diagram illustrating a workflow for blockchain storage, according to some embodiments.
Figure 4B:
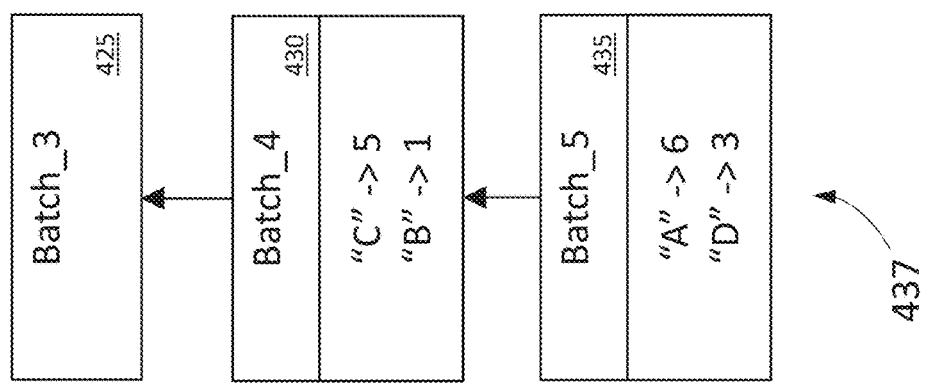
Figure 4B:
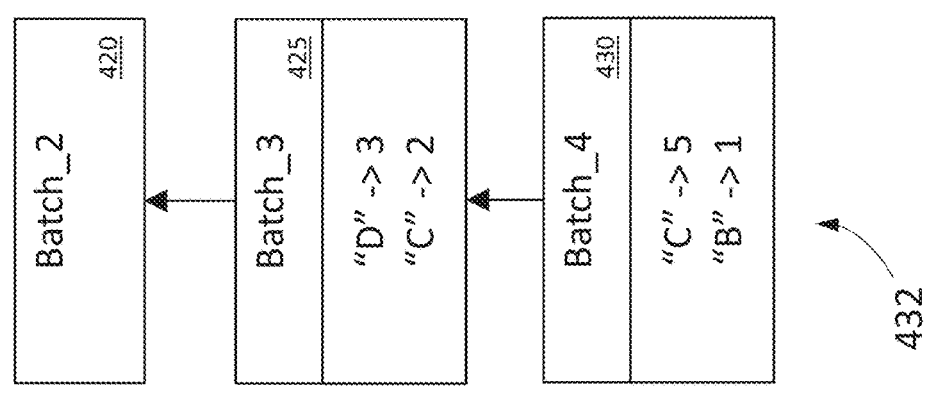
Figure 4B:
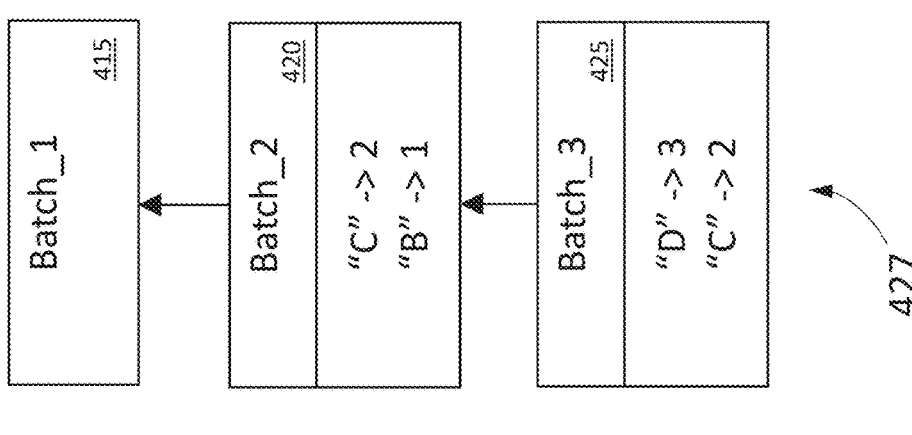

FIG. 4A and FIG. 4B are a block diagram illustrating a workflow 400 for blockchain storage, according to some embodiments. The workflow 400 is similar to the embodiment of the workflow 300 discussed above with respect to FIGS. 3A-3B, and like reference numerals have been used to refer to the same or similar components. A detailed description of these components will be omitted, and the following discussion focuses on the differences between these embodiments. Any of the various features discussed with any one of the embodiments discussed herein may also apply to and be used with any other embodiments.

In this example, the same number of entries are reprocessed as writes are made to the database. This limits the maximum number of writes for a single batch to be twice the number of entries the user requested. The number of batches stored on disk are accordingly dependent on the size of the database. As illustrated in FIG. 4A, an initial state of the blockchain is represented by blockchain diagram 402. Before any data is stored in the blockchain, the initial state 405 of the database is empty, and the state of the database may be represented by the empty set:

{ }.

The first batch 410, labeled Batch_0, is written, in which 2 entries are added to the database, "A"→0 and "B"→1. After this operation, the state of the blockchain is represented by blockchain diagram 412, and the state of the database is now:

{"A": 0, "B": 1}.

The second batch 415, labeled Batch_1, is written, in which 1 entry is removed from the database, "Delete A." Because 1 entry is being written, an unmodified entry is reprocessed and included in the next batch. In this case, "A" has been modified, as a modification is about to be written to it. Therefore, the unmodified entry that will be read is entry "B." Because Batch_0 is redundant after writing Batch_1, Batch_0 can be deleted. After this operation, the state of the blockchain is represented by blockchain diagram 417, and the state of the database is now:

{"B": 1}.

The third batch 420, labeled Batch_2, is written, in which 1 entry is added to the database, "C"→2. Because 1 entry is being written, an unmodified entry is reprocessed and included in the next batch. In this case, "A" is again skipped, as the delete is no longer relevant to the current state. Therefore, the unmodified entry that will be read is entry "B." Because Batch_1 is redundant after writing Batch_2, Batch_1 can be deleted. After this operation, the state of the blockchain is represented by blockchain diagram 422, and the state of the database is now:

{"B": 1, "C": 2}.

Continuing to FIG. 4B, the fourth batch 425, labeled Batch_3, is written, in which 1 entry is added to the database, "D"→3. The first unmodified entry is "C," so it is rewritten in Batch_3. Batch_2 cannot yet be deleted, as it still contains an unmodified entry "B." After this operation, the state of the blockchain is represented by blockchain diagram 427, and the state of the database is now:

{"B": 1, "C": 2, "D": 3}.

The fifth batch 430, labeled Batch_4, is written, in which 1 entry is updated in the database, "C"→5. The first unmodified entry is "B," so it is rewritten in Batch_4. This makes Batch_2 irrelevant, so it can be deleted after writing Batch_4. After this operation, the state of the blockchain is represented by blockchain diagram 432, and the state of the database is now:

{"B": 1, "C": 5, "D": 3}.

The sixth batch 435, labeled Batch_5, is written, in which 1 entry is added to the database, "A"→6. The first unmodified entry is "D," so it is rewritten in Batch_5. Because "C" was already re-written in Batch_4, Batch_3 is now irrelevant, so Batch_3 is deleted. After this operation, the state of the blockchain is represented by blockchain diagram 437, and the state of the database is now:

{"A": 6, "B": 1, "C": 5, "D": 3}.

Note that in this example, the data is stored in the database with sorted keys (A, B, C, D). This facilitates finding the value associated with a given key.

Some embodiments attempt to avoid re-writing sections of the database that are predominantly still active. This may be done, for example, by maintaining a fixed number of logs and writing on when it has too much useless information stored therein.

Moreover, some embodiments enable authentication when downloading the database from an untrusted third party. In some embodiments, checksums are included in each batch. For example, each batch may include metadata, the metadata including one or more of the hash of the prior batch (including all of that batch's metadata) and the oldest batch number that is required to know the full state. In this manner, all that is required to download the database from an untrusted source is knowing the hash of the most recent batch.

Figure 5:
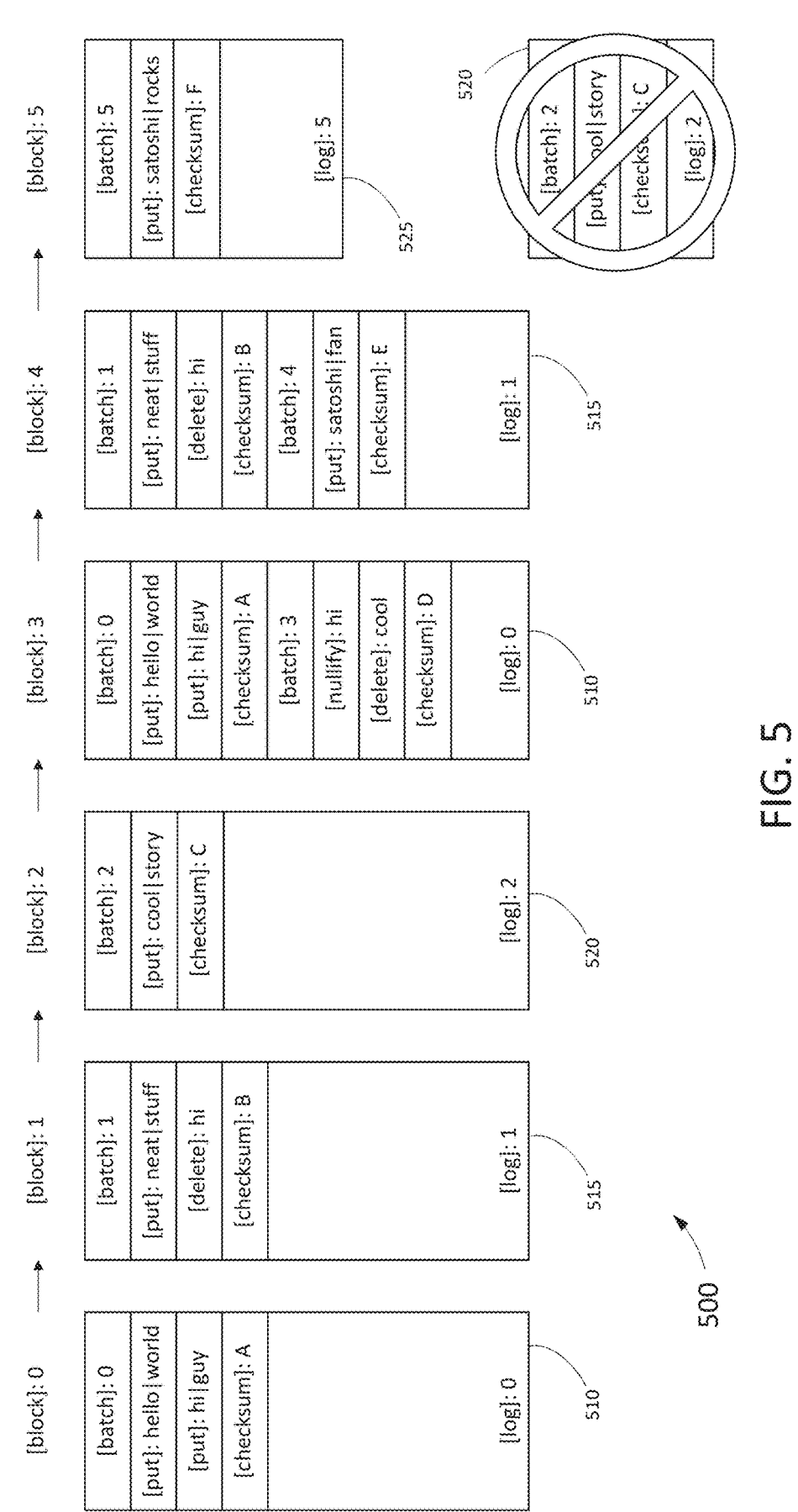
FIG. 5 is a block diagram illustrating a workflow for blockchain storage, according to some embodiments.

FIG. 5 is a block diagram illustrating a workflow 500 for blockchain storage, according to some embodiments. The workflow 500 is similar to the embodiments of the workflow 300 discussed above with respect to FIGS. 3A-3B and the workflow 400 discussed above with respect to FIGS. 4A-4B, and like reference numerals have been used to refer to the same or similar components. A detailed description of these components will be omitted, and the following discussion focuses on the differences between these embodiments. Any of the various features discussed with any one of the embodiments discussed herein may also apply to and be used with any other embodiments.

In this example, operations are written deterministically, so that all parties generate the same checksum for this and all subsequent batches. In this example, the maximum number of logs is set to three.

The example begins ("block 0"), in which a first batch ("batch 0") is written to a first log file 510. The first batch includes two write operations ("put" operations) and the checksum value of this batch ("A").

For the next block, a second batch ("batch 1") is written to a second log file 515. The second batch includes a write operation and a delete operation, and the checksum value of this batch ("B").

For the next block ("block 2"), a third batch ("batch 2") is written to a third log file 520. The third batch includes a write operation and the checksum value of this batch ("C").

For the next block ("block 3"), a fourth batch ("batch 3") is written to the first log file 510. Since the maximum number of logs have been written, the next log file is re-used and includes a nullification of the deleted entry. The fourth batch includes a delete operation and the checksum value of this batch ("D").

For the next block ("block 4"), a fifth batch ("batch 4") is written to the second log file 515. Since the maximum number of logs have been written, the next log file is re-used, and no nullifications are needed since no subsequent delete operations apply to the entries in this log. The fifth batch includes a write operation and the checksum value of this batch ("E").

For the next block ("block 5"), a sixth batch ("batch 5") is written to a new log file 525. The reason a new log file is used instead of reusing the third log file 520 is because the amount of obsolete information in the third log file 520 exceeds the amount of useful information. The reason that the third log file 520 contains only obsolete information is because the sole entry in that log ("cool|story") written during batch 2 was subsequently deleted during batch 3. The third log file 520 is accordingly deleted after the new log file 525 is written, and the new log file 525 takes the place of the third log file 520 in the rotation. The sixth batch includes a write operation and the checksum value of this batch ("F").

Figure 6A:
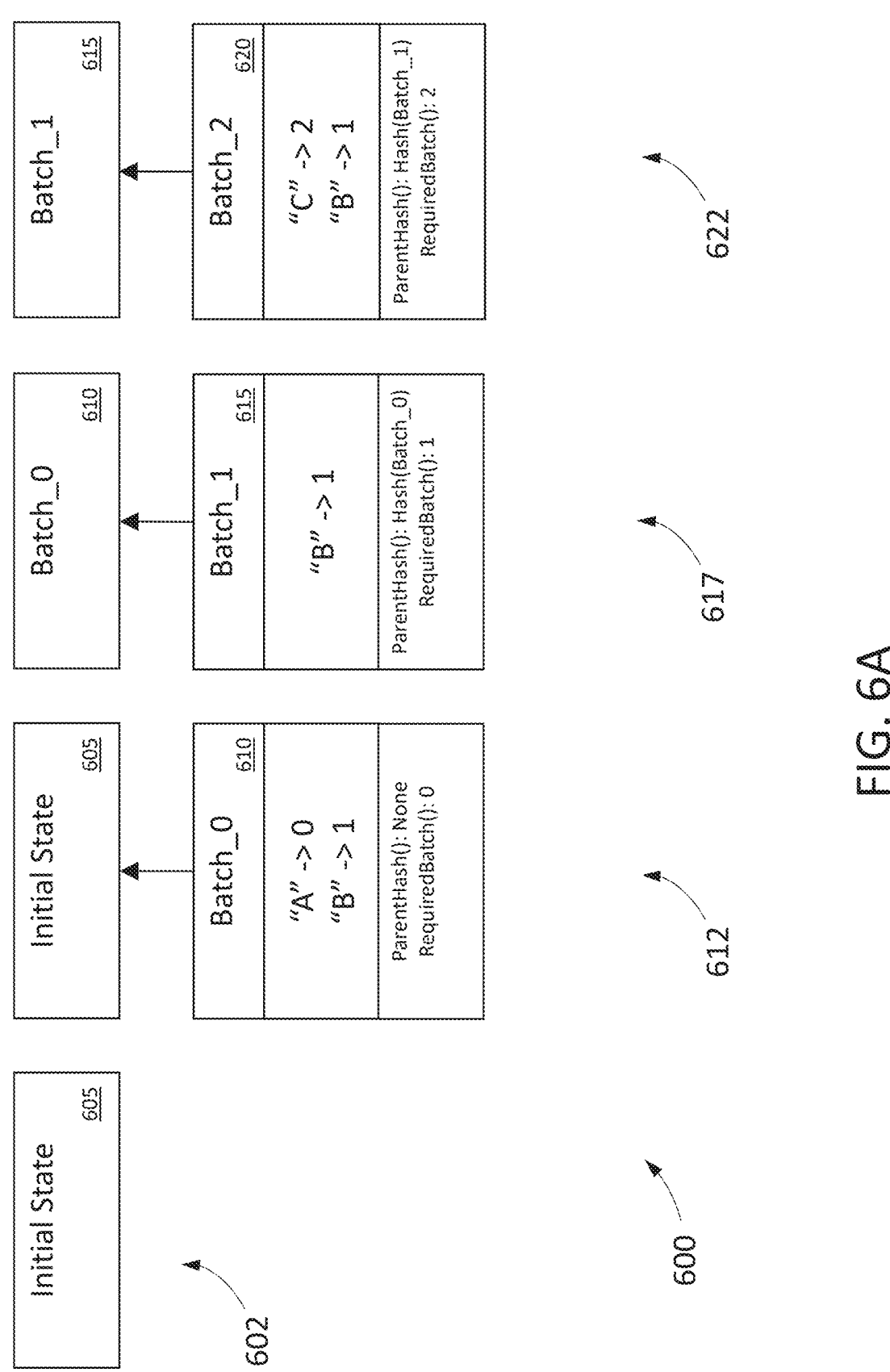
FIG. 6A and FIG. 6B are a block diagram illustrating a workflow for blockchain storage, according to some embodiments.
Figure 6B:
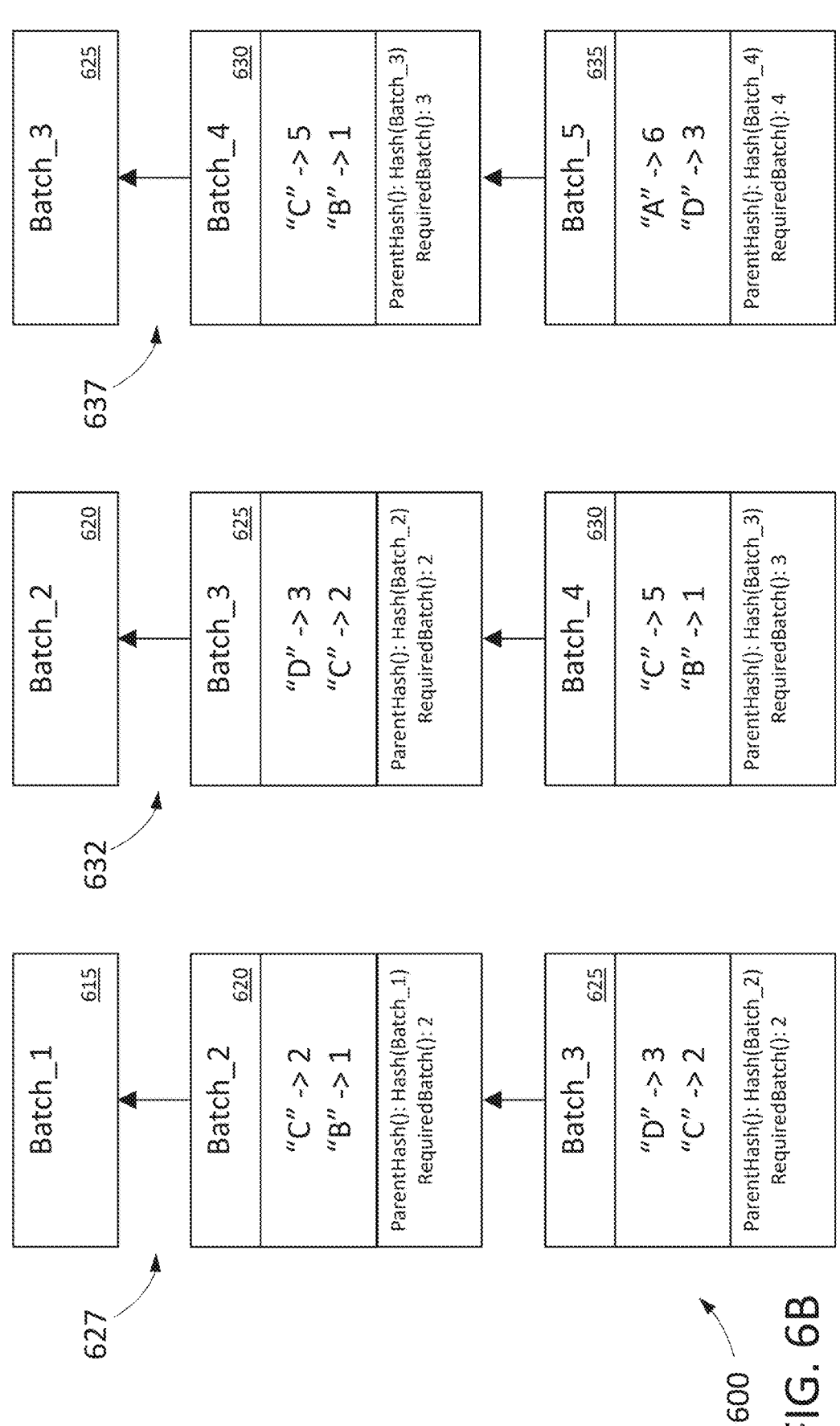

FIG. 6A and FIG. 6B are block diagrams illustrating a workflow 600 for blockchain storage, according to some embodiments. The workflow 600 is similar to the embodiments of the workflow 300 discussed above with respect to FIGS. 3A-3B, the workflow 400 discussed above with respect to FIGS. 4A-4B, and the workflow 500 discussed above with respect to FIG. 5, and like reference numerals have been used to refer to the same or similar components. A detailed description of these components will be omitted, and the following discussion focuses on the differences between these embodiments. Any of the various features discussed with any one of the embodiments discussed herein may also apply to and be used with any other embodiments.

This example is similar to that of workflow 400 which is described above with reference to FIG. 4A and FIG. 4B. In this example, metadata is added to each batch, to indicate the hash value of the batch's parent batch (here indicated by a function labeled "ParentHash") and to indicate the batch number of the earliest batch that is required to rebuild the database ("RequiredBatch"). By retrieving the indicated earliest batch and all intervening batches including the current batch, the database may be updated to the current state as of the current batch. Likewise, any previous state of the database corresponding to any particular batch may be reconstructed by downloading all batches previous to the particular batch indicated by the value of RequiredBatch for that particular batch (and the corresponding ParentHash values).

As illustrated in FIG. 6A, an initial state of the blockchain is represented by blockchain diagram 602. Before any data is stored in the blockchain, the initial state 605 of the database is empty, and the state of the database may be represented by the empty set:

{ }.

The first batch 610, labeled Batch_0, is written, in which 2 entries are added to the database, "A"→0 and "B"→1. Since this is the first batch, there is no parent batch, so ParentHash is set to None, and RequiredBatch is equal to 0 (referring to Batch_0). After this operation, the state of the blockchain is represented by blockchain diagram 612, and the state of the database is now:

{"A": 0, "B": 1}.

The second batch 615, labeled Batch_1, is written, in which 1 entry is removed from the database, "Delete A." For this batch, ParentHash is set to the hash value of Batch_0 (including all metadata), and RequiredBatch is equal to 1 (referring to Batch_1). Unlike the example in FIGS. 4A-4B, by including the RequiredBatch value in Batch_1, there is no longer a need to include "Delete A" in Batch_1. Because Batch_0 is redundant after writing Batch_1, Batch_0 can be deleted. After this operation, the state of the blockchain is represented by blockchain diagram 617, and the state of the database is now:

{"B": 1}.

The third batch 620, labeled Batch_2, is written, in which 1 entry is added to the database, "C"→2. The unmodified entry "B" is reprocessed and included in the batch. For this batch, ParentHash is set to the hash value of Batch_1 (including all metadata), and RequiredBatch is equal to 2 (referring to Batch_2). Because Batch_1 is redundant after writing Batch_2, Batch_1 can be deleted. After this operation, the state of the blockchain is represented by blockchain diagram 622, and the state of the database is now:

{"B": 1, "C": 2}.

Continuing to FIG. 6B, the fourth batch 625, labeled Batch_3, is written, in which 1 entry is added to the database, "D"→3. The first unmodified entry is "C," so it is rewritten in Batch_3. Batch_2 cannot yet be deleted, as it still contains an unmodified entry "B." For Batch_3, ParentHash is set to the hash value of Batch_2 (including all metadata), and RequiredBatch is still equal to 2 (referring to Batch_2). After this operation, the state of the blockchain is represented by blockchain diagram 627, and the state of the database is now:

{"B": 1, "C": 2, "D": 3}.

The fifth batch 630, labeled Batch_4, is written, in which 1 entry is updated in the database, "C"→5. The first unmodified entry is "B," so it is rewritten in Batch_4. This makes Batch_2 irrelevant, so it can be deleted after writing Batch_4. For Batch_4, ParentHash is set to the hash value of Batch_3 (including all metadata), and RequiredBatch is equal to 3 (referring to Batch_3). After this operation, the state of the blockchain is represented by blockchain diagram 632, and the state of the database is now:

{"B": 1, "C": 5, "D": 3}.

The sixth batch 635, labeled Batch_5, is written, in which 1 entry is added to the database, "A"→6. The first unmodified entry is "D," so it is rewritten in Batch_5. Because "C" was already re-written in Batch_4, Batch_3 is now irrelevant, so Batch_3 is deleted. For Batch_5, ParentHash is set to the hash value of Batch_4 (including all metadata), and RequiredBatch is equal to 4 (referring to Batch_4). After this operation, the state of the blockchain is represented by blockchain diagram 637, and the state of the database is now:

{"A": 6, "B": 1, "C": 5, "D": 3}.

Note that in this example, the data is stored in the database with sorted keys (A, B, C, D). This facilitates finding the value associated with a given key.

In the example of FIGS. 6A-6B, downloading the state after Batch_6 could be done by the following sequence of operations:

1. Download Batch_6
2. Download Batch_5
3. Download Batch_4
4. Download Batch_3
5. Download Batch_2
6. Download Batch_1
7. Download Batch_0

While downloading the database with simple checksums guarantees database integrity and prevents a malicious peer from providing a significant amount of useless data, downloading the database in this manner may be slow. It is only possible to prove that a batch is valid after having fetched the batch that came immediately after it and verifying that later batch. To allow parallelizing downloads, in some embodiments, additional hashes can be included into a batch. As a non-limiting example, a batch may include the hashes of batches 1, 2, 4, . . . $2^n$ sooner in the database. By doing this, multiple sections of the database can be downloaded in parallel after downloading the most recent batch.

Figure 7:
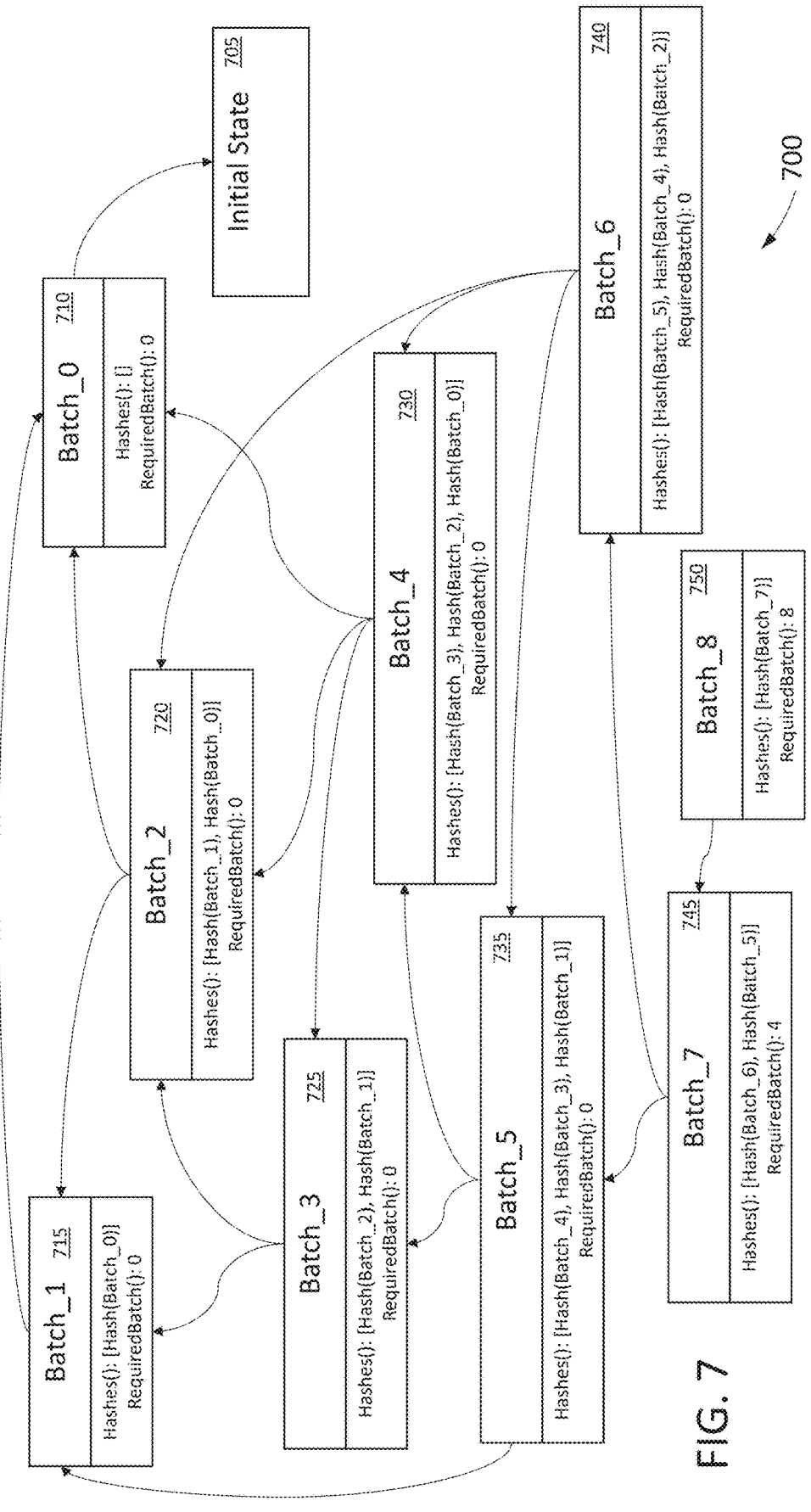
FIG. 7 is a block diagram illustrating a workflow for blockchain storage, according to some embodiments.

FIG. 7 is a block diagram illustrating a workflow 700 for blockchain storage, according to some embodiments. The workflow 700 is similar to the embodiments of the workflow 300 discussed above with respect to FIGS. 3A-3B, the workflow 400 discussed above with respect to FIGS. 4A-4B, the workflow 500 discussed above with respect to FIG. 5, and the workflow 600 discussed above with respect to FIGS. 6A-6B, and like reference numerals have been used to refer to the same or similar components. A detailed description of these components will be omitted, and the following discussion focuses on the differences between these embodiments. Any of the various features discussed with any one of the embodiments discussed herein may also apply to and be used with any other embodiments.

This example is similar to that of workflow 600 which is described above with reference to FIG. 6A and FIG. 6B. In this example, the metadata added to each batch includes hashes of one or more previous batches (here indicated by a function labeled "Hashes") and the batch number of the earliest batch that is required to rebuild the database ("RequiredBatch"). By retrieving the indicated earliest batch and all intervening batches including the current batch, the database may be updated to the current state as of the current batch. Likewise, any previous state of the database corresponding to any particular batch may be reconstructed by downloading all batches previous to the particular batch indicated by the value of RequiredBatch for that particular batch (and the corresponding ParentHash values).

As illustrated in FIG. 7, the initial state 705 of the database is empty. The first batch 710, labeled Batch_0, has Hashes equal to None, and RequiredBatch is equal to 0 (referring to Batch_0).

The second batch 715, labeled Batch_1, has Hashes equal to the hash value of Batch_0 (including all metadata), and RequiredBatch is equal to 0 (referring to Batch_0).

The third batch 720, labeled Batch_2, has Hashes equal to the hash value of Batch_0 and Batch_1 (including all metadata), and RequiredBatch is equal to 0 (referring to Batch_0).

The fourth batch 725, labeled Batch_3, has Hashes equal to the hash value of Batch_2 and Batch_1 (including all metadata), and RequiredBatch is equal to 0 (referring to Batch_0).

The fifth batch 730, labeled Batch_4, has Hashes equal to the hash value of Batch_3, Batch_2, and Batch_0 (including all metadata), and RequiredBatch is equal to 0 (referring to Batch_0).

The sixth batch 735, labeled Batch_5, has Hashes equal to the hash value of Batch_4, Batch_3, and Batch_1 (including all metadata), and RequiredBatch is equal to 0 (referring to Batch_0).

The seventh batch 740, labeled Batch_6, has Hashes equal to the hash value of Batch_5, Batch_4, and Batch_2 (including all metadata), and RequiredBatch is equal to 0 (referring to Batch_0).

The eighth batch 745, labeled Batch_7, has Hashes equal to the hash value of Batch_6 and Batch_5 (including all metadata), and RequiredBatch is equal to 4 (referring to Batch_4).

The ninth batch 750, labeled Batch_8, has Hashes equal to the hash value of Batch_7 (including all metadata), and RequiredBatch is equal to 8 (referring to Batch_8).

In the example of FIG. 7, downloading the state after Batch_6 could be done by the following sequence of operations:

1. Download Batch_6
2. Download Batch_5, Batch_4, and Batch_2 in parallel
3. Download Batch_3 and Batch_1 in parallel
4. Download Batch_0

Compared to using simple checksums (e.g., as in the example of FIGS. 6A-B above), the state can be downloaded with only four operations rather than seven. As the size of the database increases, the parallelization may grow significantly. In some embodiments, a custom sequence could be used instead of directly using powers of 2. As a non-limiting example, a custom sequence could be defined as 1, 1024, 2048, . . . $1024*2^n$ to reduce the number of hashes but maintain a high level of parallelism.

An exponential checksum distribution may not be ideal for download speed. Some embodiments may not use a simple checksum (as the example of FIGS. 6A-B) or an exponential checksum (as the example of FIG. 7), but any other deterministic mechanism for selecting prior hashes. As a non-limiting example, $x>0$ hashes could be selected (where x is an agreed-upon parameter) such that the number of sequential operations to download the state would be minimized.

FIG. 8 is a flowchart illustrating a process 800 for storing blockchain data performed by a device (e.g., participant 110-1, etc.) and/or a server (e.g., participant 130-1, etc.), according to some embodiments. In some embodiments, one or more operations in process 800 may be performed by a processor circuit (e.g., processors 205, etc.) executing instructions stored in a memory circuit (e.g., memories 220, etc.) of a system (e.g., system 200, etc.) as disclosed herein. For example, operations in process 800 may be performed by blockchain application 222, blockchain engine 250, or some combination thereof. Moreover, in some embodiments, a process consistent with this disclosure may include at least operations in process 800 performed in a different order, simultaneously, quasi-simultaneously, or overlapping in time.

At 810, the process 800 receives a batch command, that includes one or more write operations. The write operations may include one or more of a create operation, a read operation, an update operation, or a delete operation.

At 820, the process 800 performs the write operations to add entries to a new log file.

At 825, the process 800 determines whether a maximum number of log files have been written (e.g., stored to a disk, saved to a memory, etc.). If YES, the process 800 proceeds to 830, which is described below. If NO, the process 800 ends, or returns to 810, which is described above.

At 830, the process 800 copies active entries from the oldest log file to the new log file.

At 840, the process 800 appends the active entries to the new log file.

At 850, the process 800 deletes the oldest log file.

Figure 9:
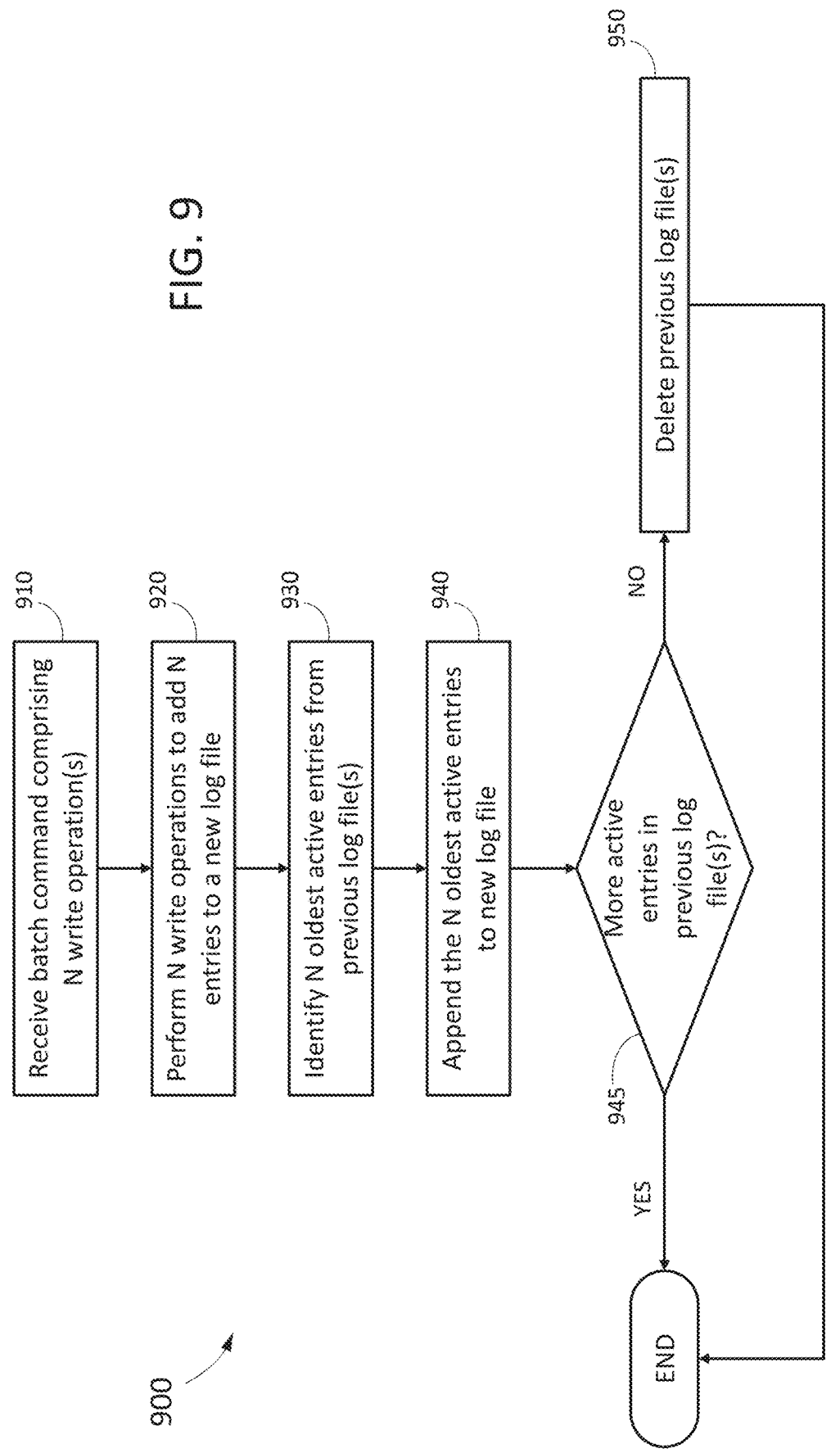
FIG. 9 is a flowchart illustrating a process for storing blockchain data, according to some embodiments.

FIG. 9 is a flowchart illustrating a process 900 for storing blockchain data performed by a device (e.g., participant 110-1, etc.) and/or a server (e.g., participant 130-1, etc.), according to some embodiments. In some embodiments, one or more operations in process 900 may be performed by a processor circuit (e.g., processors 205, etc.) executing instructions stored in a memory circuit (e.g., memories 220, etc.) of a system (e.g., system 200, etc.) as disclosed herein. For example, operations in process 900 may be performed by blockchain application 222, blockchain engine 250, or some combination thereof. Moreover, in some embodiments, a process consistent with this disclosure may include at least operations in process 900 performed in a different order, simultaneously, quasi-simultaneously, or overlapping in time.

At 910, the process 900 receives a batch command that includes N write operations, where N is greater than or equal to one. The write operations may include one or more of a create operation, a read operation, an update operation, or a delete operation. In some embodiments, the batch command comprises metadata. The metadata may include a hash value of at least one previous log file (including any metadata) and may further include a reference to a particular previous log file. The reference may be the oldest batch number that is required to know the full state of the data.

At 920, the process 900 performs N write operations to add N entries to a new log file.

At 930, the process 900 identifies N oldest active entries from previous log files. In some embodiments, identifying the N oldest active entries includes determining which entries have not been modified by any subsequent entries, sorting these unmodified entries by time/date, and selecting the N oldest.

At 940, the process 900 appends the N oldest active entries to the new log file. In some embodiments, the process 900 copies the N oldest active entries from the previous log files to the new log file.

At 945, the process 900 determines whether there are other active entries in the previous log files. If YES, the process 900 ends, or returns to 910, which is described above. If NO, the process 900 proceeds to 950, which is described below.

At 950, the process 900 deletes the previous log files.

Figure 10:
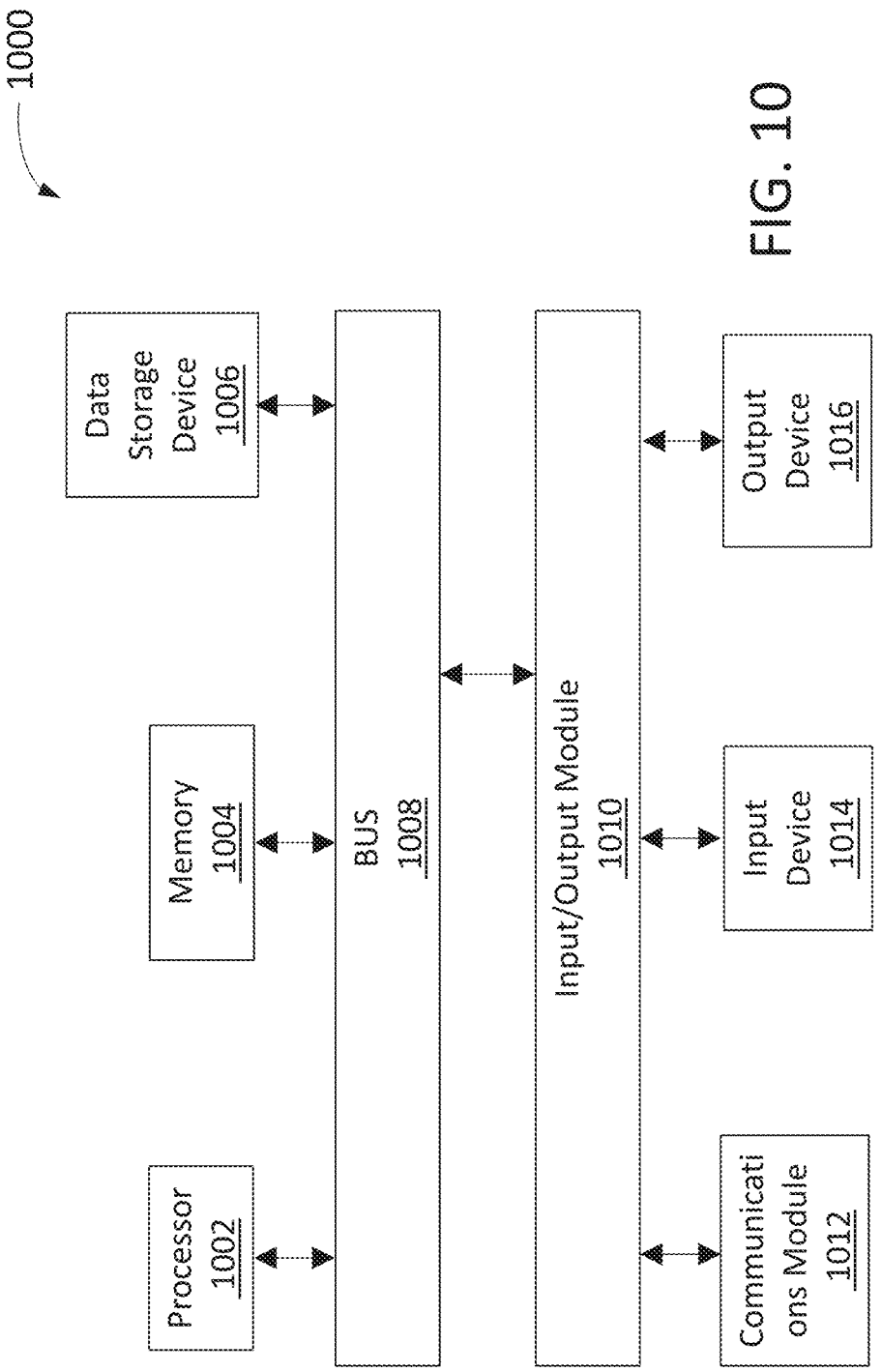
FIG. 10 is a block diagram illustrating an exemplary computer system with which aspects of the subject technology can be implemented, according to some embodiments.

FIG. 10 is a block diagram illustrating an exemplary computer system 1000 with which aspects of the subject technology can be implemented. In certain aspects, the computer system 1000 may be implemented using hardware or a combination of software and hardware, either in a dedicated server, integrated into another entity, or distributed across multiple entities. As a non-limiting example, the computer system 1000 may be one or more of the participants 130 and/or the participants 110.

Computer system 1000 includes a bus 1008 or other communication mechanism for communicating information, and a processor 1002 coupled with bus 1008 for processing information. By way of example, the computer system 1000 may be implemented with one or more processors 1002. Processor 1002 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

An example embodiment is now described. This embodiment processed 5 billion micropayments at a sustained rate of 100,000 transactions per second (TPS). This example involved 10,000,000 active accounts (2,500,000 active every 60 seconds and 95,000 active every second) sending transfers to each other [6]. Configuration details and performance results for this embodiment are described in more detail below.

Devnet Configuration 50 equal-weight validators (c7g.8xlarge=>32 vCPU, 64 GB RAM, 100 GB io2 EBS with 2500 IOPS) deployed over 5 regions (us-west-2, us-east-1, ap-south-1, ap-northeast-1, eu-west-1) running Snowman Consensus 5 API nodes (c7g.8xlarge=>32 vCPU, 64 GB RAM, 100 GB io2 EBS with 2500 IOPS) deployed over 5 regions (us-west-2, us-east-1, ap-south-1, ap-northeast-1, eu-west-1)

1 transaction issuer (c7gn.8xlarge=>32 vCPU, 64 GB RAM) in eu-west-1. Transactions issued randomly to API nodes over a websocket connection (never sent to validators directly)

10,000,000 active accounts, ~2,500,000 unique active accounts per 60 seconds, ~95,000 unique active accounts per second, account activity determined using a Zipf-Mandelbrot Distribution (s=1.0001 v=2.7)

All transactions were transfers and each transfer had its own signature (Ed25519) that was verified by all participants. All state changes were persisted to disk using an embodiment of storage for blockchain systems as described above. Accepted blocks and chunks were pruned after reaching a depth of 512.

Results

~20 MB/s of finalized transaction data

~13 MB/s of both inbound and outbound network bandwidth per validator (there is less than 20 MB/s of data sent between validators because all messages are compressed using zstd)

Bandwidth usage was similar across all validators (no hotspots/imbalance)

0% expiry and/or failure rate for transactions, chunks, and blocks

80% of transactions could be executed immediately (non-conflicting transactions were processed in parallel)

~230 ms Time-To-Confirm Chunk (from production of chunk to generation of chunk certificate)

~700 ms Time-to-Chunk Attestation (issuer sends transaction to API→issuer receives notification from API that transaction is included in attested chunk)

~3.25 s End-to-End Time-to-Finality (issuer sends transaction to API→issuers receive notification from API that transaction is final)

~35% CPU usage per validator

25 GB of disk space used per validator (blocks and chunks continuously pruned)

Computer system 1000 can include, in addition to hardware, code that creates an execution environment for the computer program in question, e.g., code that constitutes processor firmware, a protocol stack, a database management system, an operating system, or a combination of one or more of them stored in an included memory 1004, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 1008 for storing information and instructions to be executed by processor 1002. The processor 1002 and the memory 1004 can be supplemented by, or incorporated in, special purpose logic circuitry.

The instructions may be stored in the memory 1004 and implemented in one or more computer program products, i.e., one or more modules of computer program instructions encoded on a computer-readable medium for execution by, or to control the operation of, the computer system 1000, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, Wirth languages, and xml-based languages. Memory 1004 may also be used for storing temporary variable or other intermediate information during execution of instructions to be executed by processor 1002.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 1000 further includes a data storage device 1006 such as a magnetic disk or optical disk, coupled to bus 1008 for storing information and instructions. Computer system 1000 may be coupled via input/output module 1010 to various devices. The input/output module 1010 can be any input/output module. Exemplary input/output modules 1010 include data ports such as USB ports. The input/output module 1010 is configured to connect to a communications module 1012. Exemplary communications modules 1012 include networking interface cards, such as Ethernet cards and modems. In certain aspects, the input/output module 1010 is configured to connect to a plurality of devices, such as an input device 1014 and/or an output device 1016. Exemplary input devices 1014 include a keyboard and a pointing device, e.g., a mouse or a trackball, by which a user can provide input to the computer system 1000. Other kinds of input devices 1014 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 1016 include display devices such as an LCD (liquid crystal display) monitor, for displaying information to the user.

According to one aspect of the present disclosure, the above-described embodiments can be implemented using a computer system 1000 in response to processor 1002 executing one or more sequences of one or more instructions contained in memory 1004. Such instructions may be read into memory 1004 from another machine-readable medium, such as data storage device 1006. Execution of the sequences of instructions contained in the main memory 1004 causes processor 1002 to perform the process steps described herein. One or more processors in a multi-processing arrangement may also be employed to execute the sequences of instructions contained in memory 1004. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 1000 can include clients and servers. A client and server are generally remote from each other and typically interact through a communication network. The relationship of client and server arises by virtue of computer programs running on the respective computers and having a client-server relationship to each other. Computer system 1000 can be, for example, and without limitation, a desktop computer, laptop computer, or tablet computer. Computer system 1000 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 1002 for execution. Such a medium may take many forms, including, but not limited to, non-volatile media, volatile media, and transmission media. Non-volatile media include, for example, optical or magnetic disks, such as data storage device 1006. Volatile media include dynamic memory, such as memory 1004. Transmission media include coaxial cables, copper wire, and fiber optics, including the wires that comprise bus 1008. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As the user computing system 1000 reads application data and provides an application, information may be read from the application data and stored in a memory device, such as the memory 1004. Additionally, data from the memory 1004 servers accessed via a network, the bus 1008, or the data storage 1006 may be read and loaded into the memory 1004. Although data is described as being found in the memory 1004, it will be understood that data does not have to be stored in the memory 1004 and may be stored in other memory accessible to the processor 1002 or distributed among several media, such as the data storage 1006.

Many of the above-described features and applications may be implemented as software processes that are specified as a set of instructions recorded on a computer-readable storage medium (alternatively referred to as computer-readable media, machine-readable media, or machine-readable storage media). When these instructions are executed by one or more processing unit(s) (e.g., one or more processors, cores of processors, or other processing units), they cause the processing unit(s) to perform the actions indicated in the instructions. Examples of computer-readable media include, but are not limited to, RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra-density optical discs, any other optical or magnetic media, and floppy disks. In one or more embodiments, the computer-readable media does not include carrier waves and electronic signals passing wirelessly or over wired connections, or any other ephemeral signals. For example, the computer-readable media may be entirely restricted to tangible, physical objects that store information in a form that is readable by a computer. In some embodiments, the computer-readable media is non-transitory computer-readable media, or non-transitory computer-readable storage media.

In one or more embodiments, a computer program product (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

While the above discussion primarily refers to microprocessor or multi-core processors that execute software, one or more embodiments are performed by one or more integrated circuits, such as application specific integrated circuits (ASICs) or field programmable gate arrays (FPGAs). In one or more embodiments, such integrated circuits execute instructions that are stored on the circuit itself.

REFERENCES

[1] Merkle Patricia Trie. Last modified Sep. 4, 2024. https://ethereum.org/en/developers/docs/data-structures-and-encoding/patricia-merkle-trie/
[2] From the Labs: Handling Blockchain State. Jun. 2, 2023. https://www.avax.network/blog/from-the-labs-handling-blockchain-state
[3] Merkle DB README file (GitHub repository). Last modified Mar. 14, 2024. https://github.com/ava-labs/avalanchego/blob/7975cb723fa17d909017db6578252642ba796a62/x/merkledb/README.md?plain=1#L194
[4] Dodging a bullet: Ethereum State Problems. May 18, 2021. https://blog.ethereum.org/2021/05/18/eth-state-problems
[5] Introducing Firewood: A Next-Generation Database Built for High-Throughput Blockchains. Sep. 27, 2023. https://www.avax.network/blog/introducing-firewood-a-next-generation-database-built-for-high-throughput-blockchains
[6] Processing 5 Billion Micropayments (at 100 k TPS) with Vryx and Vilmo. Apr. 18, 2024. https://hackmd.ioi/@patrickogrady/vryx-poc While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way), all without departing from the scope of the subject technology.

It is understood that any specific order or hierarchy of blocks in the processes disclosed is an illustration of example approaches. Based upon implementation preferences, it is understood that the specific order or hierarchy of blocks in the processes may be rearranged, or that not all illustrated blocks be performed. Any of the blocks may be performed simultaneously. In one or more embodiments, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The subject technology is illustrated, for example, according to various aspects described above. The present disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

A reference to an element in the singular is not intended to mean "one and only one" unless specifically stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the disclosure.

To the extent that the terms "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments. In one aspect, various alternative configurations and operations described herein may be considered to be at least equivalent.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an embodiment may refer to one or more embodiments and vice versa. A phrase such as a "configuration"

does not imply that such configuration is essential to the subject technology or that such configuration applies to all configurations of the subject technology. A disclosure relating to a configuration may apply to all configurations, or one or more configurations. A configuration may provide one or more examples. A phrase such as a configuration may refer to one or more configurations and vice versa.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain. It is understood that some or all steps, operations, or processes may be performed automatically, without the intervention of a user.

Method claims may be provided to present elements of the various steps, operations, or processes in a sample order, and are not meant to be limited to the specific order or hierarchy presented.

In one aspect, a method may be an operation, an instruction, or a function and vice versa. In one aspect, a claim may be amended to include some or all of the words (e.g., instructions, operations, functions, or components) recited in other one or more claims, one or more words, one or more sentences, one or more phrases, one or more paragraphs, and/or one or more claims.

All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

The Title, Background, and Brief Description of the Drawings of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples, and the various features are grouped together in various embodiments for the purpose of streamlining the disclosure. This method of disclosure is not to be interpreted as reflecting an intention that the included subject matter requires more features than are expressly recited in any claim. Rather, as the claims reflect, inventive subject matter lies in less than all features of a single disclosed configuration or operation. The claims are hereby incorporated into the Detailed Description, with each claim standing on its own to represent separately patentable subject matter.

The claims are not intended to be limited to the aspects described herein but are to be accorded the full scope consistent with the language of the claims and to encompass all legal equivalents. Notwithstanding, none of the claims are intended to embrace subject matter that fails to satisfy the requirement of 35 U.S.C. § 101, 102, or 103, nor should they be interpreted in such a way.

Embodiments consistent with the present disclosure may be combined with any combination of features or aspects of embodiments described herein.

The invention claimed is:

1. A method for storing blockchain data, comprising:
receiving a first batch command, the first batch command comprising one or more write operations;
adding one or more entries to a current log file by performing the one or more write operations;
making a first determination that a maximum number of log files have previously been written;
based on the first determination, identifying one or more active entries from one or more previous log files;
appending copies of the identified one or more active entries to the current log file; and
based on the first determination and a second determination that the one or more previous log files do not comprise any other active entries, deleting the one or more previous log files,
wherein identifying the one or more active entries comprises determining that the one or more active entries have not been modified by any subsequent entries, and
wherein a current number of log files cannot exceed the maximum number of log files.

2. The method of claim 1, further comprising writing metadata to the current log file, wherein the metadata comprises a hash value of at least one previous log file.

3. The method of claim 2, wherein the metadata further comprises a reference to a particular previous log file.

4. The method of claim 1, wherein the one or more active entries are the oldest active entries in the one or more previous log files.

5. The method of claim 1, wherein the current log file is a first log file, the one or more active entries are a first set of one or more active entries, and the method further comprises:
receiving a second batch command, the second batch command comprising one or more additional write operations;
performing the one or more additional write operations to a second log file;
identifying a second set of one or more active entries from the first log file; and
appending copies of the identified second set of one or more active entries to the second log file.

6. The method of claim 5, wherein the method further comprises:
making a third determination that the first log file does not comprise any additional active entries; and
based on the third determination, deleting the first log file.

7. The method of claim 5, wherein the second set of one or more active entries are the oldest active entries in the first log file.

8. The method of claim 1, wherein each write operation is one of a create operation, a read operation, an update operation, or a delete operation.

9. A non-transitory computer-readable medium storing a program for storing blockchain data, which when executed by a computer, configures the computer to:
receive a first batch command, the first batch command comprising one or more write operations;
add one or more entries to a current log file by performing the one or more write operations;
make a first determination that a maximum number of log files have previously been written;
based on the first determination, identify one or more active entries from one or more previous log files;

append copies of the identified one or more active entries to the current log file; and
based on the first determination and a second determination that the one or more previous log files do not comprise any other active entries, delete the one or more previous log files,
wherein identifying the one or more active entries comprises determining that the one or more active entries have not been modified by any subsequent entries, and
wherein a current number of log files cannot exceed the maximum number of log files.

10. The non-transitory computer-readable medium of claim 9, wherein the program, when executed by the computer, further configures the computer to write metadata to the current log file, wherein the metadata comprises a hash value of at least one previous log file.

11. The non-transitory computer-readable medium of claim 10, wherein the metadata further comprises a reference to a particular previous log file.

12. The non-transitory computer-readable medium of claim 9, wherein the one or more active entries are the oldest active entries in the one or more previous log files.

13. The non-transitory computer-readable medium of claim 9, wherein the current log file is a first log file, the one or more active entries are a first set of one or more active entries, and the program, when executed by the computer, further configures the computer to:
receive a second batch command, the second batch command comprising one or more additional write operations;
perform the one or more additional write operations to a second log file;
identify a second set of one or more active entries from the first log file; and
append copies of the identified second set of one or more active entries to the second log file.

14. The non-transitory computer-readable medium of claim 13, wherein the program, when executed by the computer, further configures the computer to:
make a third determination that the first log file does not comprise any additional active entries; and
based on the third determination, delete the first log file.

15. The non-transitory computer-readable medium of claim 13, wherein the second set of one or more active entries are the oldest active entries in the first log file.

16. The non-transitory computer-readable medium of claim 9, wherein each write operation is one of a create operation, a read operation, an update operation, or a delete operation.

17. A system for storing blockchain data, comprising:
a processor; and
a non-transitory computer readable medium storing a set of instructions, which when executed by the processor, configure the system to:
receive a first batch command, the first batch command comprising one or more write operations;
add one or more entries to a current log file by performing the one or more write operations;
make a first determination that a maximum number of log files have previously been written;
based on the first determination, identify one or more active entries from one or more previous log files;
append copies of the identified one or more active entries to the current log file; and
based on the first determination and a second determination that the one or more previous log files do not comprise any additional active entries, delete the one or more previous log files, wherein identifying the one or more active entries comprises determining that the one or more active entries have not been modified by any subsequent entries, and wherein a current number of log files cannot exceed the maximum number of log files.

18. The system of claim 17, wherein the instructions, when executed by the processor, further configure the system to write metadata to the current log file, wherein the metadata comprises one or more of a hash value of at least one previous log file and a reference to a particular previous log file.

* * * * *